(12) United States Patent
Anthony, III et al.

(10) Patent No.: US 12,271,558 B2
(45) Date of Patent: Apr. 8, 2025

(54) AUTOMATIC LIQUID DETECTION

(71) Applicant: Google LLC, Mountain View, CA (US)

(72) Inventors: John J. Anthony, III, East Lyme, CT (US); Aaron Michael Rudolph, Penryn, CA (US); Tyler Gore, Mountain View, CA (US); Sushant Sundaresh, San Carlos, CA (US)

(73) Assignee: Google LLC, Mountain View, CA (US)

( * ) Notice: Subject to any disclaimer, the term of this patent is extended or adjusted under 35 U.S.C. 154(b) by 12 days.

(21) Appl. No.: 18/348,157

(22) Filed: Jul. 6, 2023

(65) Prior Publication Data

US 2025/0013331 A1 Jan. 9, 2025

(51) Int. Cl.
 *G06F 3/041* (2006.01)
 *H04M 1/72454* (2021.01)
 *G06F 1/3218* (2019.01)
 *G06F 1/3287* (2019.01)

(52) U.S. Cl.
 CPC .... *G06F 3/04186* (2019.05); *H04M 1/72454* (2021.01); *G06F 1/3218* (2013.01); *G06F 2203/04105* (2013.01)

(58) Field of Classification Search
 CPC ......... G06F 2203/04105; G06F 3/0418; G06F 3/04186; G06F 1/3218; G06N 20/00; H04M 1/72454
 USPC ........................................................ 345/173
 See application file for complete search history.

(56) References Cited

U.S. PATENT DOCUMENTS

| | | | |
|---|---|---|---|
| 10,184,856 B2 * | 1/2019 | Ueno | G01B 21/18 |
| 10,372,260 B2 * | 8/2019 | Huffman | G06F 3/0416 |
| 11,422,689 B1 * | 8/2022 | Spencer | G06F 3/0447 |
| 11,989,374 B2 * | 5/2024 | Dou | G06F 3/04186 |
| 2008/0136792 A1 | 6/2008 | Peng et al. | |
| 2012/0146924 A1 * | 6/2012 | Inoue | H04N 23/62 345/173 |
| 2015/0062069 A1 * | 3/2015 | Shin | G06F 3/044 345/174 |
| 2016/0334294 A1 * | 11/2016 | Ueno | G06F 1/1633 |
| 2016/0337597 A1 * | 11/2016 | Miura | H04N 23/62 |
| 2018/0307375 A1 * | 10/2018 | Shah | G06F 3/04186 |
| 2019/0064998 A1 * | 2/2019 | Chowdhury | G03B 17/08 |
| 2019/0102001 A1 | 4/2019 | O'Connor | |
| 2019/0266236 A1 * | 8/2019 | Battach | G06N 3/045 |
| 2020/0012382 A1 | 1/2020 | Lee | |

(Continued)

OTHER PUBLICATIONS

Apple Inc., "How to use Water Lock and eject water from your Apple Watch", retrived from: https://support.apple.com/en-us/HT210931, Sep. 22, 2022, 2 pp.

(Continued)

*Primary Examiner* — Julie Anne Watko
(74) *Attorney, Agent, or Firm* — Shumaker & Sieffert, P.A.

(57) ABSTRACT

A computing device may determine, based on one or more inputs detected by a presence-sensitive screen, whether at least a threshold amount of liquid is present on the presence-sensitive screen. The computing device may automatically transition the computing device from operating in a first operating mode to operating in a second operating mode responsive to determining that at least the threshold amount of liquid is present. The computing device may discard inputs detected by the presence-sensitive screen while the computing device is operating in the second operating mode.

14 Claims, 8 Drawing Sheets

(56) References Cited

U.S. PATENT DOCUMENTS

| | | | |
|---|---|---|---|
| 2020/0184959 A1* | 6/2020 | Yasa | G10L 15/1815 |
| 2020/0210060 A1 | 7/2020 | Jones et al. | |
| 2021/0068713 A1* | 3/2021 | Dervisoglu | A61B 5/0205 |
| 2021/0181137 A1 | 6/2021 | Chowdhury et al. | |

OTHER PUBLICATIONS

Shahid et al., "Erasure of Device Data Upon Detection of Underwater Submersion", Technical Disclosure Commons, Aug. 26, 2019, 8 pp.

International Search Report and Written Opinion of International Application No. PCT/US2024/031288 dated Sep. 13, 2024, 13 pp.

* cited by examiner

AUTOMATIC LIQUID DETECTION

BACKGROUND

Computing devices often have presence-sensitive screens to receive input from users. Presence-sensitive screens typically use touch inputs to navigate and control applications and other functionality on the computing device. Unfortunately, these presence-sensitive screens may generate false positive touch events when exposed to liquids, such as water. For example, complete submersion of a wearable device may lead to false positive touch and/or gesture events. Such false positive touch/gesture events may put the wearable device into an undesirable state from a user perspective (e.g., the foregrounded application may be dismissed, undesired features invoked, applications undesirably backgrounded or dismissed, alarms disabled, telephone calls made, etc.).

Swimming and other water-based activities pose a particular problem for wearable devices. For example, the user may use an application on their wearable device to track their swim. The user may launch an application on the wearable device with the ability to track swimming activity, configure options such as pool size, and start a workout tracking session. As the user begins to swim, the immersion of the wearable device into the water may lead to false touch events, which may negatively impact the user experience.

SUMMARY

In general, aspects of this disclosure are directed to techniques for preventing liquid from adversely and/or inadvertently modifying the state of a computing device with a presence-sensitive screen. The computing device may determine the presence of liquid at the presence-sensitive screen and then put the computing device in a mode, such as a touch lock mode, where inputs from the presence-sensitive screen are discarded to effectively disable the presence-sensitive screen and prevent the liquid from modifying the state of the computing device. Disabling the presence-sensitive screen may prevent false touch events and lead to a more predictable user experience. A user may disable touch lock mode through a button press or a combination of button presses. In addition, the automatic determination of an end of the presence of liquid, such as the end of a water immersion event, may cause the invocation of other beneficial features to the user and the device. For example, the computing device may automatically end a swimming interval or workout and/or invoke a water ejection function to clear an audio speaker.

The computing device may analyze the output of one or more sensors to determine whether the computing device is submerged or otherwise has liquid on the presence-sensitive screen. For example, the computing device may analyze the outputs of the presence-sensitive screen using techniques such as moving averages and heuristics. The computing device may use outputs from additional sensors such as barometers, onboard thermistors, and light sensors to increase the confidence that the computing device is submerged or otherwise has liquid on the presence-sensitive screen. The computing device may also distinguish between finger touches and water droplets by deriving feature values from intensity data from the presence-sensitive screen and providing the feature values to a machine-learned model.

The computing device may also determine the type of activity the user is engaged in when the device is submerged by applying machine-learned models trained as activity classifiers to the output of various sensors. For example, one activity classifier may recognize diving, while another activity classifier may recognize swimming. The computing device may use a hysteresis control function to prevent the device from moving/thrashing between states (submerged vs. not submerged) and to provide time for the system to generate a minimum confidence threshold that the device has transitioned between the submerged states.

In some examples, a method comprises determining, by a computing device and based on one or more inputs detected by a presence-sensitive screen, whether at least a threshold amount of liquid is present on the presence-sensitive screen; responsive to determining that at least the threshold amount of liquid is present, automatically transitioning the computing device from operating in a first operating mode to operating in a second operating mode; and while the computing device is operating in the second operating mode, discarding, by the computing device, inputs detected by the presence-sensitive screen.

In some examples, a computing device comprising a presence-sensitive screen; memory; and at least one processor communicably coupled to the memory and configured to: determine, based on one or more inputs detected by a presence-sensitive screen, whether at least a threshold amount of liquid is present on the presence-sensitive screen, responsive to determining that at least the threshold amount of liquid is present, automatically transition from a first operating mode to a second operating mode; and while the computing device is in the second operating mode, discard inputs detected by the presence-sensitive screen.

In some examples, computer-readable storage medium having stored thereon instructions that, when executed, cause one or more processors of a computing device to: determine, whether based on one or more inputs detected by a presence-sensitive screen, at least a threshold amount of liquid is present on the presence-sensitive screen, responsive to determining that at least the threshold amount of liquid is present, automatically transition from a first operating mode to a second operating mode; and while the computing device is in the second operating mode, discard inputs detected by the presence-sensitive screen.

In some examples, a computer device comprises means for determining whether at least a threshold amount of liquid is present on the presence-sensitive screen based on one or more inputs detected by a presence-sensitive screen; means for automatically transitioning the computing device from operating in a first operating mode to operating in a second operating mode responsive to determining that at least the threshold amount of liquid is present; and means for discarding inputs detected by the presence-sensitive screen while the computing device is operating in the second operating mode.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIGS. 4A-4C are conceptual diagrams illustrating sensor values generated by a presence-sensitive screen of a computing device corresponding to inputs detected by the presence-sensitive screen, in accordance with one or more aspects of the present disclosure.

DETAILED DESCRIPTION

Figure 1:
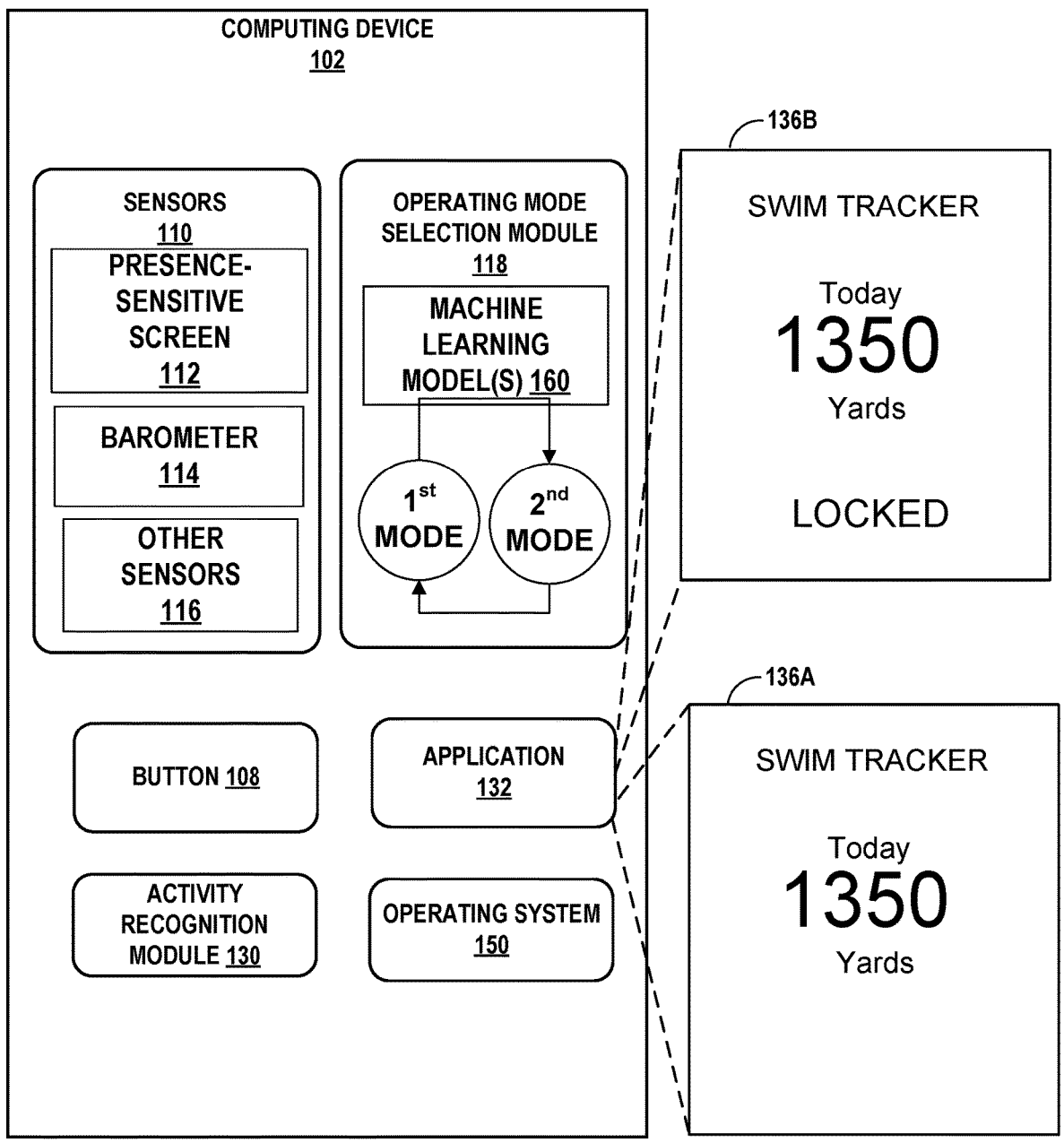
FIG. 1 is a conceptual diagram illustrating a computing device that may automatically determine a threshold amount of liquid on a presence-sensitive screen, in accordance with one or more aspects of the present disclosure.

FIG. 1 is a conceptual diagram illustrating computing device 102 that may automatically determine a threshold amount of liquid on presence-sensitive screen 112, in accordance with one or more aspects of the present disclosure. As shown in FIG. 1, computing device 102 may be a mobile computing device, such as a mobile phone (including a smartphone), a laptop computer, a tablet computer, a wearable computing device, or any other portable computing device. In some examples, computing device 102 may be a wearable computing device such as a smartwatch, a computerized fitness band/tracker, computerized eyewear, computerized headwear, a computerized glove, or any other type of mobile computing device that may attach to and/or be worn on a person's body or clothing.

Computing device 102 may include application 132 that includes functionality to perform any variety of operations on computing device 102. For instance, application 132 may include a swim tracker or other sports application, a web browser, an email application, text messaging application, instant messaging application, weather application, video conferencing application, social networking application, e-commerce application, stock market application, emergency alert application, office productivity application, multimedia player, etc. Application 132 may perform operations described herein using software, hardware, firmware, or a mixture of both hardware, software, and firmware residing in and executing on computing device 102 or at one or more other remote computing devices. In some examples, applications 132 may be implemented as hardware, software, and/or a combination of hardware and software. Computing device 102 may execute application 132 with one or more processors. Computing device 102 may execute application 132 as or within a virtual machine executing on underlying hardware. Application 132 may be implemented in various ways. For example, applications 132 may be implemented as a downloadable or pre-installed application or "app." In another example, application 132 may be implemented as part of operating system 150 of computing device 102. Other examples of computing device 102 that implement techniques of this disclosure may include additional components not shown in FIG. 1.

Computing device 102 may include sensors 110, such as presence-sensitive screen 112, barometer 114, and other sensors 116. Presence-sensitive screen 112 of computing device 102 may function as an input device for computing device 102 and as an output device for computing device 102. Presence-sensitive screen 112 may be implemented using various technologies. For instance, presence-sensitive screen 112 may function as an input device using a presence-sensitive input component, such as a resistive touchscreen, a surface acoustic wave touchscreen, a capacitive touchscreen, a projective capacitive touchscreen, an acoustic pulse recognition touchscreen, or another presence-sensitive screen technology. Presence-sensitive screen 112 may function as an output (e.g., display) device using any one or more display components, such as a liquid crystal display (LCD), dot matrix display, light emitting diode (LED) display, microLED, organic light-emitting diode (OLED) display, e-ink, or similar monochrome or color display capable of outputting visible information to a user of computing device 102. As discussed below, presence-sensitive screen 112 may have difficulty distinguishing liquid from body parts such as fingers.

As a sensor or input device, presence-sensitive screen 112 may detect inputs associated with different locations on the surface of presence-sensitive screen 112. For example, presence-sensitive screen 112 may have n outputs values related to the intensity of contacts at different locations on presence-sensitive screen 112. During regular operation, computing device 102 may use such data from presence-sensitive screen 112 to control the functions of computing device 102. For example, users may use their fingers or a stylus to start and dismiss applications, input data and make selections through presence-sensitive screen 112.

Barometer 114 may produce an atmospheric pressure signal related to the pressure at computing device 102. Barometer 114 measures an amount of atmospheric pressure to help calculate altitude or changes in atmospheric pressure used in altitude determination and weather forecasting. Barometer 114 may also measure an amount of atmospheric pressure which indicates pressure changes from submerging computing device 102 in a liquid.

Other sensors 116 may include a temperature sensor, such as a thermistor, that may produce a signal related to the temperature at computing device 102 and a light sensor that may produce a signal related to the light intensity at computing device 102 and a motion sensor, such as an accelerometer or gyroscope, that produces a signal related to the movement of the computing device 102.

Computing device 102 may use sensors 110 to determine whether at least a threshold amount of liquid is present on presence-sensitive screen 112. For example, computing device 102 may use one or more inputs detected by presence-sensitive screen 112 to determine whether at least a threshold amount of liquid is present on presence-sensitive screen 112. Computing device 102 may use machine-learned model(s) 160 discussed below to help determine whether at least a threshold amount of liquid is present on presence-sensitive screen 112.

Computing device 102 may analyze the inputs detected by presence-sensitive screen 112 and pressure signal from an onboard barometer using techniques such as moving averages and heuristics. In one example, computing device 102 may determine an immersion event in two stages. In stage 1, computing device 102 determines that a predetermined percentage of presence-sensitive screen 112 indicates contact with a substance such as a liquid when a substantial portion of the locations of presence-sensitive screen 112 has output values indicating contact. In stage 2, computing device 102 may use signals from barometer 114 to distinguish a palming event (where the user puts their palm over presence-sensitive screen 112 to invoke a feature such as a screen shut-off feature). For example, computing device 102 may determine that periods of relative high pressure signal values from barometer 114, for example, pressures that are greater than an atmospheric pressure baseline by more than a threshold, such as 5 kPa, may indicate immersion in liquid rather than a palming event.

In one example, computing device 102 may determine, based on an amount of atmospheric pressure measured by the barometer 114 and the one or more inputs detected by the presence-sensitive screen 112, whether the one or more inputs are indicative of a palming event. Computing device 102 responsive to determining that the one or more inputs are not indicative of the palming event, may determine that at least the threshold amount of liquid is present on the presence-sensitive screen 112. Computing device 102 responsive to determining that the one or more inputs are indicative of the palming event, may determine that at least the threshold amount of liquid is not present on the presence-sensitive screen 112.

Figure 5A:
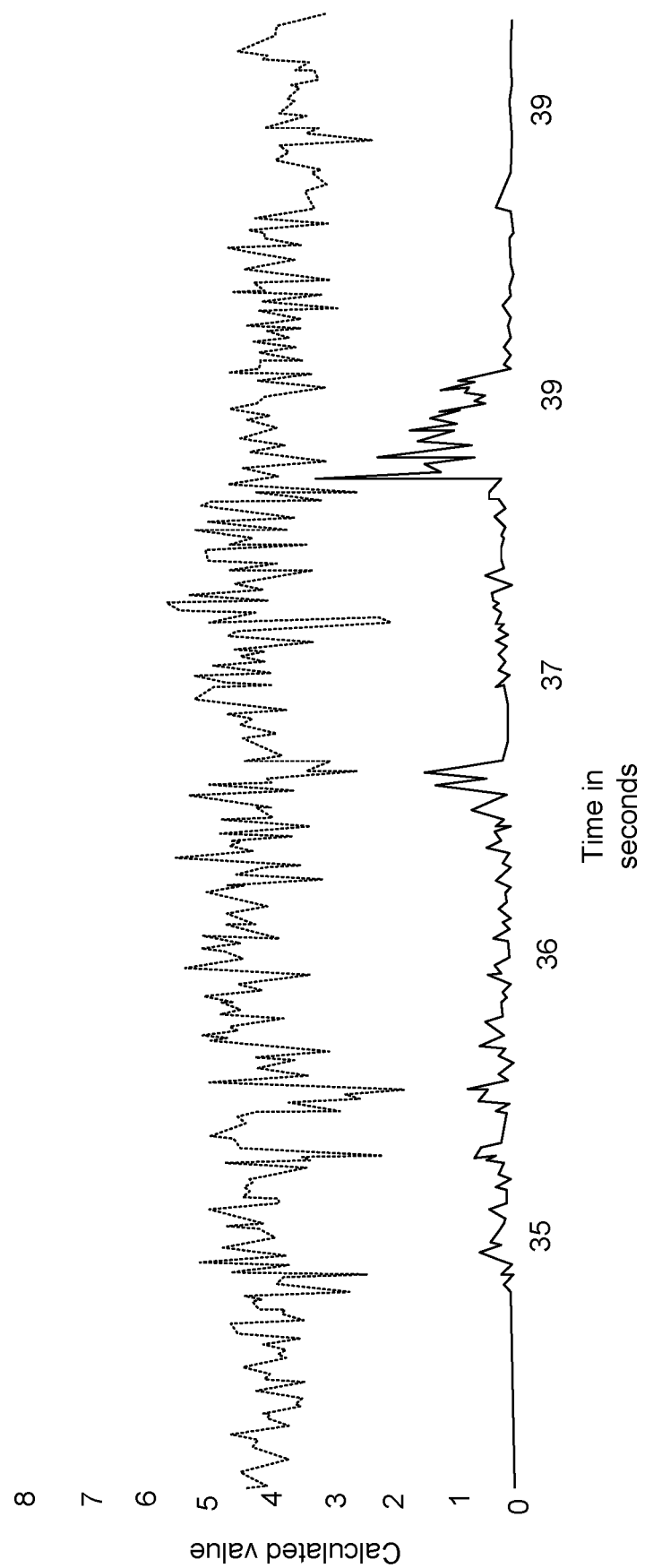
FIGS. 5A-5B are conceptual diagrams illustrating example plots of calculated feature values that a computing device may use for a liquid threshold determination, in accordance with one or more aspects of the present disclosure.
Figure 5B:
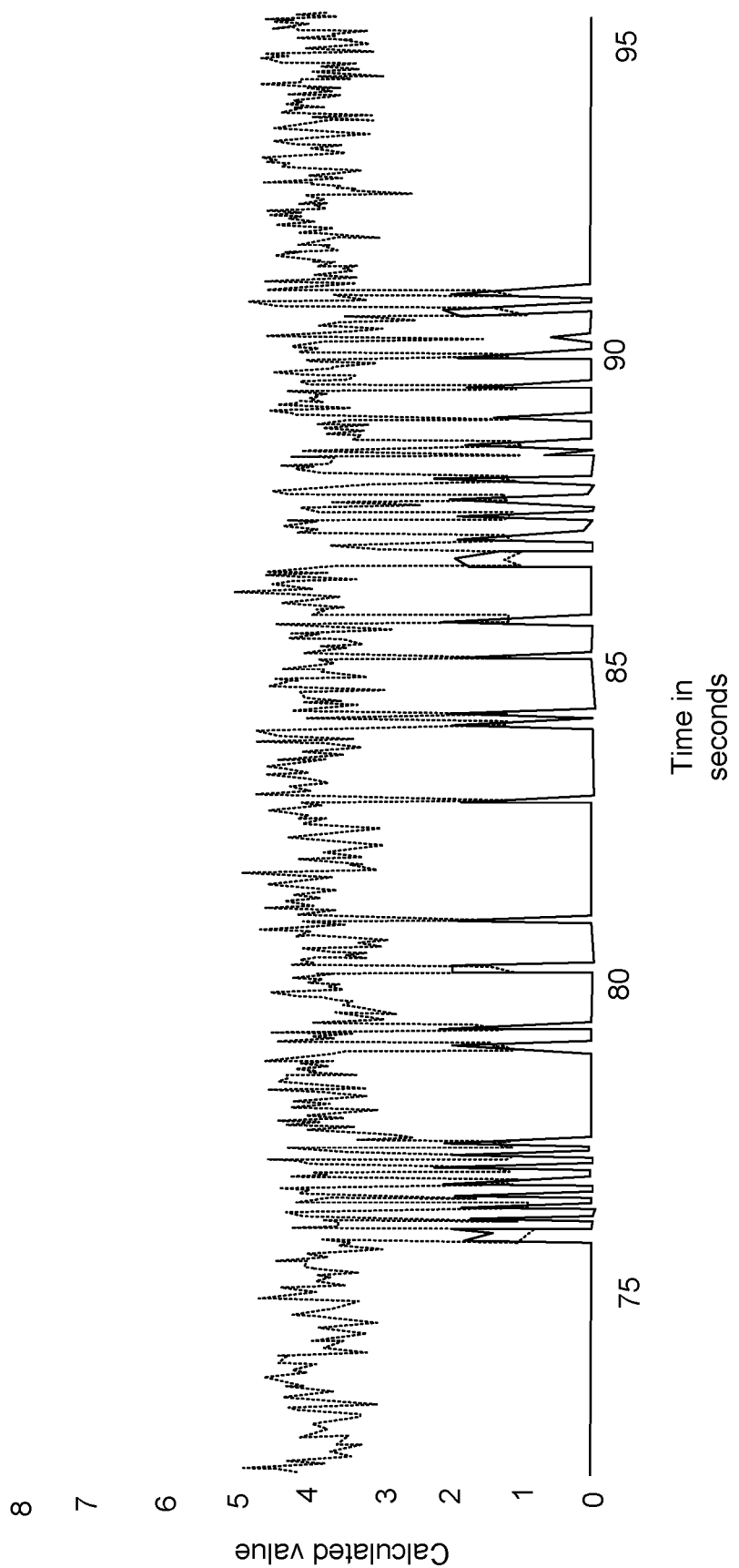

In one example, computing device 102 may use inputs detected from presence-sensitive screen 112 to create feature values that computing device 102 may use to transitioning the computing device from operating in a first operating mode to operating in a second operating mode. Computing device 102 may distinguish finger contacts to presence-sensitive screen 112 from liquid droplet contacts to the presence-sensitive screen 112 using the feature values. As shown in FIG. 5A-5B discussed below, some feature values may have a characteristically sharper spike for finger contacts than droplet contacts. The feature values may include a "mass" feature value derived from the intensity values for locations on the presence-sensitive screen 112, a "center of mass" feature value derived from the intensity values and location data for the intensity values, and a "moment of inertia" feature value derived from the intensity values, the location data for the intensity values and the "center of mass" feature value.

As discussed below, computing device 102 may determine features such as "mass" feature values, "center of mass" feature values, and "moment of inertia" feature values for each 2 dimensional frame of data from the presence-sensitive screen 112. Computing device 102 may aggregate these features over all the frames in each distinct "presence event" (from when a presence detected until presence is not detected), and preprocess them to generate a single feature vector for each presence event. Computing device 102 may filter these per-event feature vectors over time over different timescales to capture the "context" of what has been happening near the presence-sensitive screen 112. Computing device 102 may also further preprocess to generates feature crosses between the features which capture the difference between "what is happening right now" and "the context over different timescales.". Computing device 102 may provide the features as input to the ML algorithm to classify whether or not the screen is in a wet environment.

Computing device 102 may determine based on the one or more inputs detected by a presence-sensitive screen, whether the one or more inputs are indicative of liquid droplet contacts to the presence-sensitive screen. Responsive to determining that the one or more inputs are indicative of liquid droplet contacts to the presence-sensitive screen, computing device 102 may automatically transition the computing device from operating in a first operating mode to operating in a second operating mode. While the computing device is operating in the second operating mode, computing device 102 may discard, by the computing device, inputs detected by the presence-sensitive screen.

Computing device 102 may determine whether the one or more inputs are indicative of liquid droplet contacts to the presence-sensitive screen based on feature values derived from the one or more inputs. Feature values may include a "mass" feature value, a "center of mass" feature value, and/or a "moment of inertia" feature value discussed below. Computing device 102 may determining whether the one or more inputs are indicative of liquid droplet contacts to the presence-sensitive screen by providing the feature values to a machine-learned model that categorizes the feature values as being indicative of liquid droplet contacts to the presence-sensitive screen or being indicative of finger contacts to the presence-sensitive screen. An example of a machine-learned model that categorizes the feature values as being indicative of liquid droplet contacts is described below with respect to FIGS. 5A-5B.

Computing device 102 may also determine the user's activity concerning the liquid using activity recognition module 130. Activity recognition module 130 may determine an activity such as swimming, diving, showering, etc. Activity recognition module 130 may determine the user's activity using machine-learned model(s) 160. Activity recognition module 130 may use sensors 110, such as an accelerometer and/or a gyroscope, to detect motion. Computing device 102 may provide at least a portion of the motion data generated by one or more of these additional sensors into machine-learned model 160 to identify the activity in which the user is engaged. For example, computing device 102 may use an accelerometer to determine swimming events as computing device 102 moves with a swimmer's arm.

In one example, computing device 102 may detect, by one or more additional sensors of computing device 102, additional sensor input. Based on the additional sensor input and inputs detected by presence-sensitive screen 112, computing device 102 may determine whether at least the threshold amount of liquid is present on presence-sensitive screen 112 further based on the additional sensor inputs. Computing device 102 may use sensor fusion with multiple sensors. Computing device 102 may use a light detector to help determine a liquid immersion event. Computing device 102 may use barometer 114 to distinguish liquid immersion from a palming event. Computing device 102 may also use temperature signals from a temperature sensor to aid in determining an activity such as swimming.

Once computing device 102 determines that at least a threshold amount of liquid is present on presence-sensitive screen 112, operating mode selection module 118 may determine that computing device 102 should switch from operating in a first operating mode to operating in a second operating mode. In such instances, operating mode selection module 118 may provide a signal to operating system 150 that causes operating system 150 to operate in the second operating mode by at least enabling and/or disabling various hardware and software features of computing device 102. For example, while operating in the second operating mode, operating system 150 may discard inputs from presence-sensitive screen 112 to effectively disable presence-sensitive screen 112 and prevent the liquid from modifying the state of the computing device.

As another example, while operating in the second operating mode, operating system 150 may power off and/or otherwise disable one or more communication units, such as radio frequency transceivers. Radio frequency transceivers have difficulty communicating through a liquid, so the operation of the radio frequency transceiver in water may be fruitless. Further, computing device 102 may attempt to increase the power provided to the radio frequency transceiver to improve the transmissions of computing device 102 to a cell station in a manner that wastes battery life. By turning off the radio frequency transceiver in the second operating mode, computing device 102 may avoid such a waste of battery life.

Operating mode selection module 118 may determine when to exit the second operating mode using signals from the at least one sensor. Automatically exiting the second operating mode may avoid the difficulties involved in manually exiting the first operating mode. Computing device 102 may use a sound file to clear liquid out of a speaker of computing device 102 by vibrating the speaker energetically after exiting the second operating mode.

In one example, computing device 102 may determine whether to cease operating in the second operating mode based on input from one or more physical buttons of computing device 102 and/or based on input from presence-sensitive screen 112. For example, when a user presses button 108, operating mode selection module 118 may switch from the second operating mode back to the first operating mode. Operating mode selection module 118 may also determine whether to exit the second operating mode based on input from sensors 110 as discussed below.

Operating mode selection module 118 may determine whether to exit the second operating mode based at least in part on a detected activity. For example, when activity recognition module 130 determines that the user is swimming, computing device 102 may stay in the second operating mode rather than prematurely moving out of the second operating mode as the swimmer's hand with computing device 102 is temporarily moved out of the water, such as in a crawl stroke. For example, while swimming, when computing device 102 leaves the water, presence-sensitive screen 112 may stop detecting inputs from the water. In some examples, operating mode selection module 118 may determine that computing device 102 should switch back to the first operating mode causing the computing device 102 to switch between operating modes with each stroke. Thus, in various examples, operating mode selection module 118 may further determine whether to switch modes based on the activity in which the user is currently engaged as determined by activity recognition module 130. When activity recognition module 130 determines the activity is swimming, the operating mode selection mode 118 may delay switching the operating mode. When activity recognition module 130 determines the activity is some other activity, the operating mode selection mode 118 may switch modes immediately.

When operating mode selection module 118, using the at least one sensor, determines that presence-sensitive screen 112 is no longer contacting the liquid, operating mode selection module 118 may cause computing device 102 to switch back into the first operating mode. After exiting the second operating mode, computing device 102 may cease discarding inputs detected by presence-sensitive screen 112.

Operating mode selection module 118 may use hysteresis, such as time delays and/or minimum confidence thresholds, to prevent computing device 102 from prematurely exiting the second operating mode.

Rather than immediately exiting the second operating mode, computing device 102 may use a time delay period to avoid prematurely exiting the second operating mode. While operating in the second operating mode, computing device 102 may determine that the threshold amount of liquid is not present at the presence-sensitive screen 112 based on additional inputs detected by the presence-sensitive screen. Responsive to determining that the threshold amount of liquid is not present at the presence-sensitive screen 112 for at least the period of time, computing device 102 may transition the computing device from operating in the second operating mode to operating in the first operating mode. While operating in the first operating mode, inputs detected by the presence-sensitive screen 112 are not discarded.

While operating in the second operating mode, computing device 102 may detect, by the presence-sensitive screen 112, additional inputs. Computing device 102 may generate a confidence score indicative of whether to exit the second operating mode and reenter the first operating mode by at least applying machine-learned model 160 to the additional inputs. Responsive to determining that that the confidence score exceeds a minimum confidence threshold, computing device 102 may transition from operating in the second operating mode to operating in the first operating mode. While operating in the first operating mode, inputs detected by the presence-sensitive screen 112 are not discarded.

As discussed above, computing device 102 may be temporarily or intermittently out of water, such as when the user is swimming. Activity recognition module 130 may determine that the user is swimming, and the operating mode selection module 118 may inhibit the transition to the first operating mode and/or adjust the minimum confidence threshold to prevent the operating mode selection module 118 from switching back to the first operating mode.

Computing device 102 may also include button 108 used to manually toggle computing device 102 out of the second operating mode back to the first operating mode. Button 108 may be operably connected to operating mode selection module 118 to enable the user to switch out of the second operating mode (such as after the user has finished swimming).

Presence-sensitive screen 112 may be a display user interface 136. In the example of FIG. 1, user interface 136A is an interface produced for application 132 while the computing device 102 is in the first operating mode. While in the first operating mode, inputs through the presence-sensitive screen may be used to update the user interface 136A and the state of application 132. User interface 136B is an interface produced for application 132 while the computing device 102 is in the second operating mode. While in the second operating mode, computing device 102 may disable inputs through the presence-sensitive screen and thus such inputs are not used to update the user interface 136 B and the state of application 132. Application 132 or operating system 150 may indicate in user interface 136B that the computing device 102 is in the second operating mode, such as with a "locked" indication.

Disabling presence-sensitive screen 112 in the second operating mode may prevent false touch events. Such false touch events may change the state of applications preventing users from properly using the computing device 102. This is especially a problem when a user is swimming because, as the user begins to swim, the immersion of the wearable device into the water may lead to the false touch events, which may negatively impact the user experience. False touch events may cause the device to perform various unintended actions (e.g., within an application—send messages, load pages, etc.) which may consume extra power, processor cycles and battery life. When the user is swimming or otherwise unable to attend to the state of the device, the power consumption due to the false touch events may be a particular problem. Operating mode selection module 118 may prevent such inadvertent changes to applications and user interfaces, and thus enable the device to operate more efficiently while reducing or eliminating unintended actions caused by the false touches. Further, a single operating mode selection module 118 at the computing device 102 allows for the determination of a mode for the computer device 102 as a whole with requiring individual applications to deal with the issue of inadvertent screen changes separately.

Figure 2:
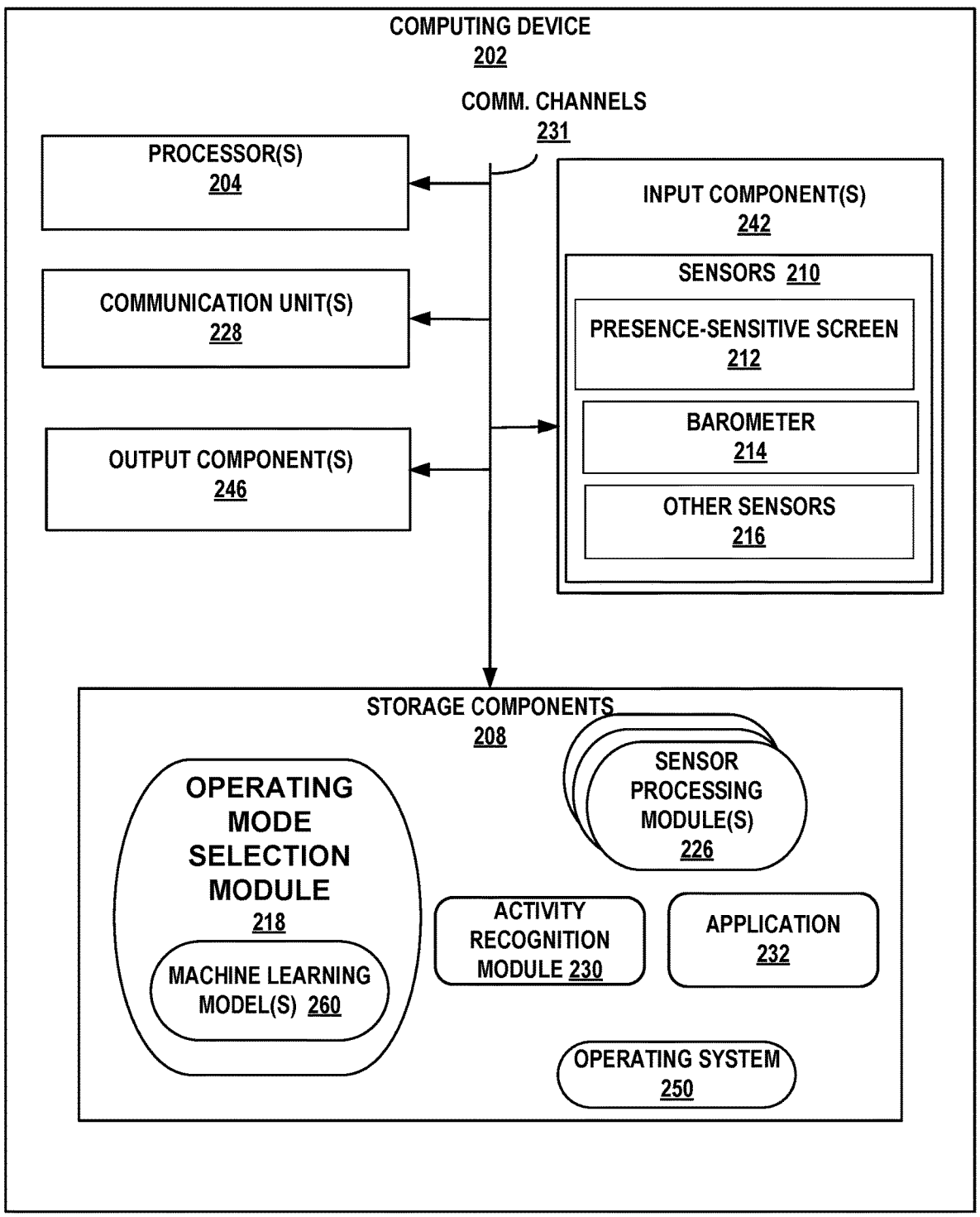
FIG. 2 is a block diagram illustrating further details of a computing device that may automatically determine a threshold amount of liquid on a presence-sensitive screen, in accordance with one or more aspects of the present disclosure.

FIG. 2 is a block diagram illustrating further details of a computing device 202 that may automatically determine a threshold amount of liquid on presence-sensitive screen 212, in accordance with one or more aspects of the present disclosure. Computing device 202 of FIG. 2 is described below as an example of computing device 102 illustrated in FIG. 1. FIG. 2 illustrates only one particular example of computing device 202, and many other examples of computing device 202 may be used in other instances and may include a subset of the components included in example computing device 202 or may include additional components not shown in FIG. 2.

As shown in the example of FIG. 2, computing device 202 includes presence-sensitive screen 212, one or more processors 204, one or more input components 242, one or more communication units 228, one or more output components 246, and one or more storage components 208. Input components 242 include one or more sensors 210, such as an input component of presence-sensitive screen 212, barometer 214, and other sensors 216. Storage components 208 of computing device 202 also include operating system 250, operating mode selection module 218, machine-learned model 260, computing device functionality 220, and sensor processing modules 226.

Communication channels 231 may interconnect each of the components for inter-component communications (physically, communicatively, and/or operatively). In some examples, communication channels 231 may include a system bus, a network connection, an inter-process communication data structure, or any other method for communicating data.

One or more input components 242 of computing device 202 may receive input. Examples of input are tactile, audio, and video input. Input components 242 of computing device 202, in one example, includes presence-sensitive screen 212, mouse, keyboard, voice responsive system, video camera, microphone or any other type of device for detecting input from a human or machine.

One or more input components 242 include one or more sensors 210. Numerous examples of sensors 210 exist and include any input component configured to obtain environmental information about the circumstances surrounding computing device 202 and/or physiological information that defines the activity state and/or physical well-being of a user of computing device 202. In some examples, a sensor may be an input component that obtains physical position, movement, and/or location information of computing device 202. Sensors 210 may include an input component of presence-sensitive screen 212, barometer 214, and other sensors 216. Other sensors 216 may include one or more location sensors (GPS components, Wi-Fi components, cellular components), one or more temperature sensors (such as thermistors), one or more motion sensors (e.g., multi-axial accelerometers, gyros), one or more ambient light sensors, and other sensors such as microphones, cameras, infrared proximity sensors, hygrometers, and the like. Other sensors may include a heart rate sensor, magnetometer, glucose sensor, hygrometer sensor, olfactory sensor, compass sensor, step counter sensor, to name a few other non-limiting examples.

One or more output components 246 of computing device 202 may generate output. Examples of output are tactile, audio, and video output. Output components 246 of computing device 202, in one example, includes a display component of presence-sensitive screen 212, sound card, video graphics adapter card, speaker, cathode ray tube (CRT) monitor, liquid crystal display (LCD), or any other type of device for generating output to a human or machine.

One or more communication units 228 of computing device 202 may communicate with external devices via one or more wired and/or wireless networks by transmitting and/or receiving network signals on the one or more networks. Examples of communication units 228 include a network interface card (such as an Ethernet card), an optical transceiver, a radio frequency transceiver, a GPS receiver, or any other type of device that may send and/or receive information. Other examples of communication units 228 may include short wave radios, cellular data radios, wireless network radios, and universal serial bus (USB) controllers.

Presence-sensitive screen 212 of computing device 202 may include a display component and a presence-sensitive input component. The display component may be a display screen at which information is displayed by presence-sensitive screen 212 and the presence-sensitive input component may detect an object at and/or near the display component. As one example range, presence-sensitive input component may detect an object, such as a finger or stylus that is within two inches or less of display component. Presence-sensitive input component may determine a location (e.g., an (x,y) coordinate) of display component at which the object was detected. In another example range, presence-sensitive input component may detect an object six inches or less from display component and other ranges are also possible. Presence-sensitive input component may determine the location of display component selected by a user's finger using capacitive, inductive, and/or optical recognition techniques. In some examples, presence-sensitive input component also provides output to a user using tactile, audio, or video stimuli as described with respect to the display component. In one example, the presence-sensitive input component of presence-sensitive screen 212 may produce intensity values for a number of locations on the screen.

In one example, presence-sensitive screen 212 represents a built-in component of computing device 202 located within and physically connected to the external packaging of computing device 202 (e.g., a screen on a smartwatch). While illustrated as an internal component of computing device 202, presence-sensitive screen 212 may also represent an external component that shares a data path with computing device 202 for transmitting and/or receiving input and output.

Presence-sensitive screen 212 of computing device 202 may receive tactile input from a user of computing device 202. Presence-sensitive screen 212 may receive indications of the tactile input by detecting one or more gestures from a user of computing device 202 (e.g., the user touching or pointing to one or more locations of presence-sensitive screen 212 with a finger or a stylus pen).

Presence-sensitive screen 212 may present output to a user. Presence-sensitive screen 212 may present the output as a graphical user interface, which may be associated with functionality provided by computing device 202. For example, presence-sensitive screen 212 may present various user interfaces of components of a computing platform, operating system 250, applications, or services executing at or accessible by computing device 202 (e.g., an electronic message application, a navigation application, an Internet browser application, a mobile operating system, etc.). A user may interact with a respective user interface to cause computing device 202 to perform operations relating to a function.

Presence-sensitive screen 212 of computing device 202 may detect two-dimensional and/or three-dimensional gestures as input from a user of computing device 202. For instance, a sensor of presence-sensitive screen 212 may detect a user's movement (e.g., moving a hand, an arm, a pen, a stylus, etc.) within a threshold distance of the sensor of presence-sensitive screen 212. Presence-sensitive screen 212 may determine a two- or three-dimensional vector representation of the movement and correlate the vector representation to a gesture input (e.g., a hand-wave, a pinch, a clap, a pen stroke, etc.) that has multiple dimensions. In other words, presence-sensitive screen 212 may detect a multi-dimensional gesture without requiring the user to gesture at or near a screen or surface at which presence-sensitive screen 212 outputs information for display. Instead, presence-sensitive screen 212 may detect a multi-dimensional gesture performed at or near a sensor which may or may not be located near the screen or surface at which presence-sensitive screen 212 outputs information for display.

One or more processors 204 may implement functionality and/or execute instructions within computing device 202. For example, processors 204 on computing device 202 may receive and execute instructions stored by storage components 208 that execute the functionality of operating system 250, operating mode selection module 218, computing device functionality 220 and machine-learned model 260. The instructions executed by processors 204 may cause computing device 202 to store information within storage components 208 during program execution. Examples of processors 204 include application processors, display controllers, sensor hubs, and any other hardware configured to function as a processing unit. Processors 204 may execute instructions of operating system 250, operating mode selection module 218, computing device functionality 220 and machine-learned model 260 to cause presence-sensitive screen 212 to render portions of content of display data as one of user interface screen shots at presence-sensitive screen 212. Operating system 250, operating mode selection module 218, computing device functionality 220 and machine-learned model 260 may be operable by processors 204 to perform various actions or functions of computing device 202.

One or more storage components 208 within computing device 202 may store information for processing during operation of computing device 202 (e.g., computing device 202 may store data accessed by operating system 250, operating mode selection module 218, computing device functionality 220 and machine-learned model 260 during execution at computing device 202). In some examples, storage component 208 is a temporary memory, meaning that a primary purpose of storage component 208 is not long-term storage. Storage components 208 on computing device 202 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 208 may store program instructions and/or information (e.g., data) associated with operating system 250, operating mode selection module 218, computing device functionality 220 and machine-learned model 260. Storage components 208, in some examples, also include one or more computer-readable storage media. Storage components 208 may be configured to store larger amounts of information than volatile memory. Storage components 208 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories.

Computing device functionality 220 represents all the various individual applications and services executing at computing device 202. A user of computing device 202 may interact with an interface (e.g., a graphical user interface) associated with one or more applications of the computing device functionality 220 to cause computing device 202 to perform a function. Numerous examples of computing device functionality 220 may exist and include, a fitness application, a calendar application, a personal assistant or prediction engine, a search application, a map or navigation application, a transportation service application (e.g., a bus or train tracking application), a social media application, a game application, an e-mail application, a messaging application, an Internet browser application, or any and all other applications that may execute at computing device 202. Although shown separately from computing device functionality 220, operating mode selection module 218 may be included within an application of the computing device functionality 220 (e.g., included within a fitness application or swimming application).

As shown in FIG. 2, computing device 202 may include sensor processing modules 226. In some examples, sensor processing modules 226 may receive outputs from sensors 210 and generate sensor data that represents the outputs. For instance, each of sensors 210 may have a corresponding sensor processing module 226. As an example, one of sensor processing modules 226 that corresponds to an input component of presence-sensitive screen 212 may convert signals to intensity values for different locations on a display component of presence-sensitive screen 212. As another example, one of sensor processing modules 226 that corresponds to barometer 214 may convert raw signals to calibrated values for use by operating mode selection module 218 and computing device functionality 220. As another example, one of sensor processing modules 226 that corresponds to a motion sensor component may generate motion and/or acceleration values along different axes of a coordinate system in the motion data, where the motion and/or acceleration values are based on hardware outputs of a motion sensor component.

In FIG. 2, operating mode selection module 218 may receive sensor data produced by one or more sensors 210. For example, operating mode selection module 218 may receive data from the input component of presence-sensitive screen 212, barometer 214, other sensors 216, or data generated by sensor processing modules 226 based on sensor data generated by sensors 210.

Operating mode selection module 218 may, in response to receiving the sensor data produced by the one or more sensors, determine, using one or more neural networks, that at least a threshold amount of liquid is present on the presence-sensitive screen and select an appropriate mode for computing device 202. Operating mode selection module 218 may include machine-learned model 260, which may include one or more neural networks trained off-device. Operating mode selection module 218 may categorize events such as liquid immersion, water droplets, palming events, and activities such as swimming and diving.

Examples of machine-learned model 260 may include one or more deep or shallow neural networks, recurrent neural networks, or any other suitable artificial neural network as well as other machine-learned models such as linear support vector machines (SVMs). Machine-learned model 260 may take as input the sensor data produced by one or more sensors 210, such as the input unit of presence-sensitive screen 212, barometer 214 and other sensors such as motion sensors, light sensors, and temperature sensors over a period of time. Machine-learned model 260 may output one or more probabilities, such as a probability distribution, corresponding to one or more categories.

Machine-learned model 260 may include an ensemble of gradient boosted decision trees and a hysteresis filter. A decision tree is a flowchart-like tree structure. In gradient boosting decision trees, relatively weak decision trees are connected in series and each decision tree attempts to minimize the error of the previous tree. Computing device 202 may use a hysteresis filter to prevent the output of Machine-learned model 260 from moving/thrashing between states.

Operating mode selection module 218 may cause computing device 202 to enter a second operating mode, such as a touch lock mode, in which the computing device 202 discards inputs from presence-sensitive screen 212 to disable presence-sensitive screen 212 and prevent the liquid from modifying the state of the computing device. Operating mode selection module 218 may also turn off communication units such as radio frequency transceivers in the second operating mode to save power and battery life. Operating mode selection module 218 may use signals from at least one of sensors 210 to determine when to transition from the first operating mode to the second operating mode. Application 232 or operating system 250 may use the selected mode to determine whether to lock a user interface to prevent inadvertent changes to the application state.

Activity recognition module 230 may determine an activity such as swimming, diving, showering, etc. Activity recognition module 130 may use sensors 210, such as an accelerometer and/or a gyroscope, to detect motion. Computing device 102 may provide at least a portion of the motion data generated by one or more of these additional sensors into machine-learned model 260 to identify the activity in which the user is engaged. For example, computing device 202 may use an accelerometer to determine swimming events as computing device 202 moves with a swimmer's arm.

Operating mode selection module 218 may determine when to exit the second operating mode using signals from the at least one sensor. Computing device 202 may use a sound file to clear out a speaker of computing device 202 after exiting the second operating mode.

Computing device 202 may use sensor fusion with additional sensors, including motion sensors such as accelerometers or gyroscopes, light detectors, and barometer 214 to help categorize relevant events (such as liquid immersion, water droplets, palming events, and activities such as swimming and diving) and determine when to enter and exit the second operating mode.

Figure 3A:
FIGS. 3A-3C are conceptual diagrams illustrating aspects of an example machine-learned model trained for liquid threshold determination and/or activity recognition, in accordance with one or more aspects of the present disclosure.
Figure 3B:
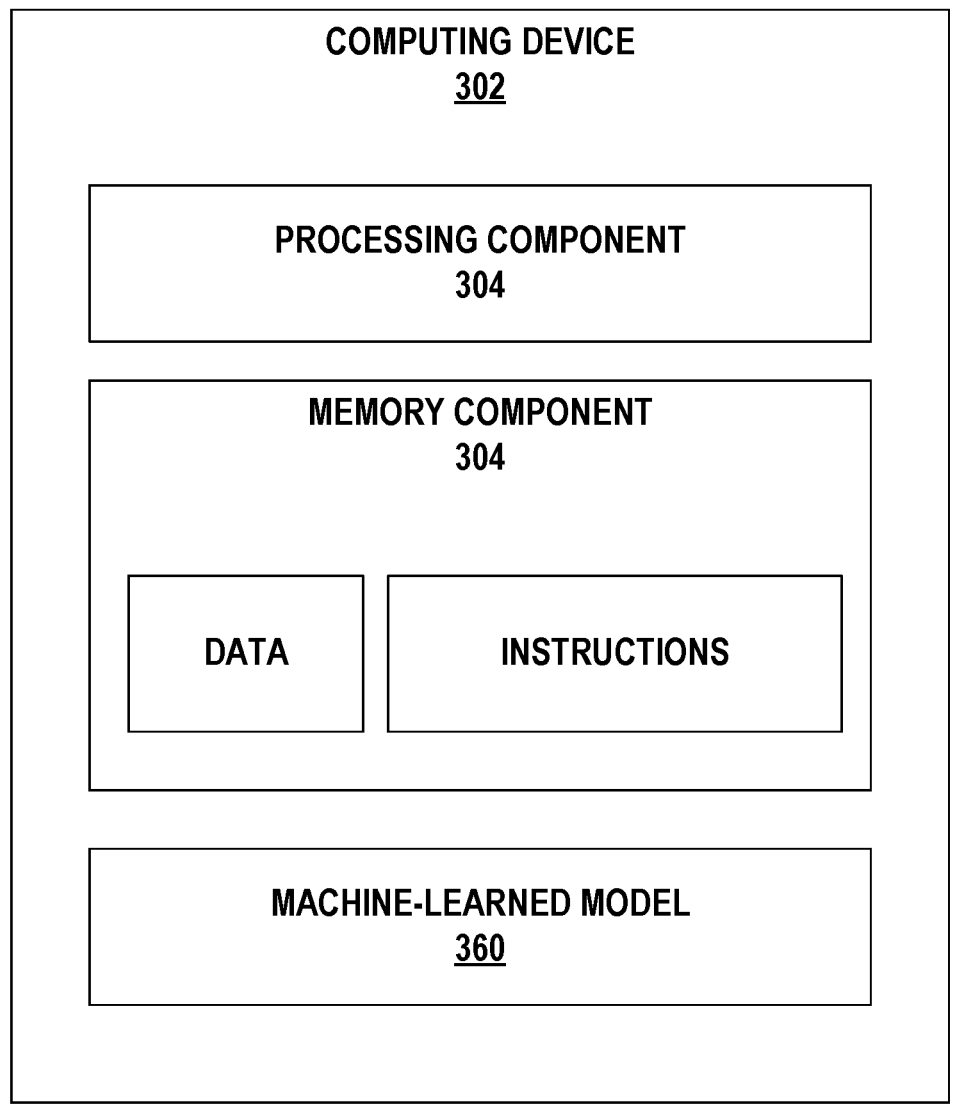
Figure 3C:
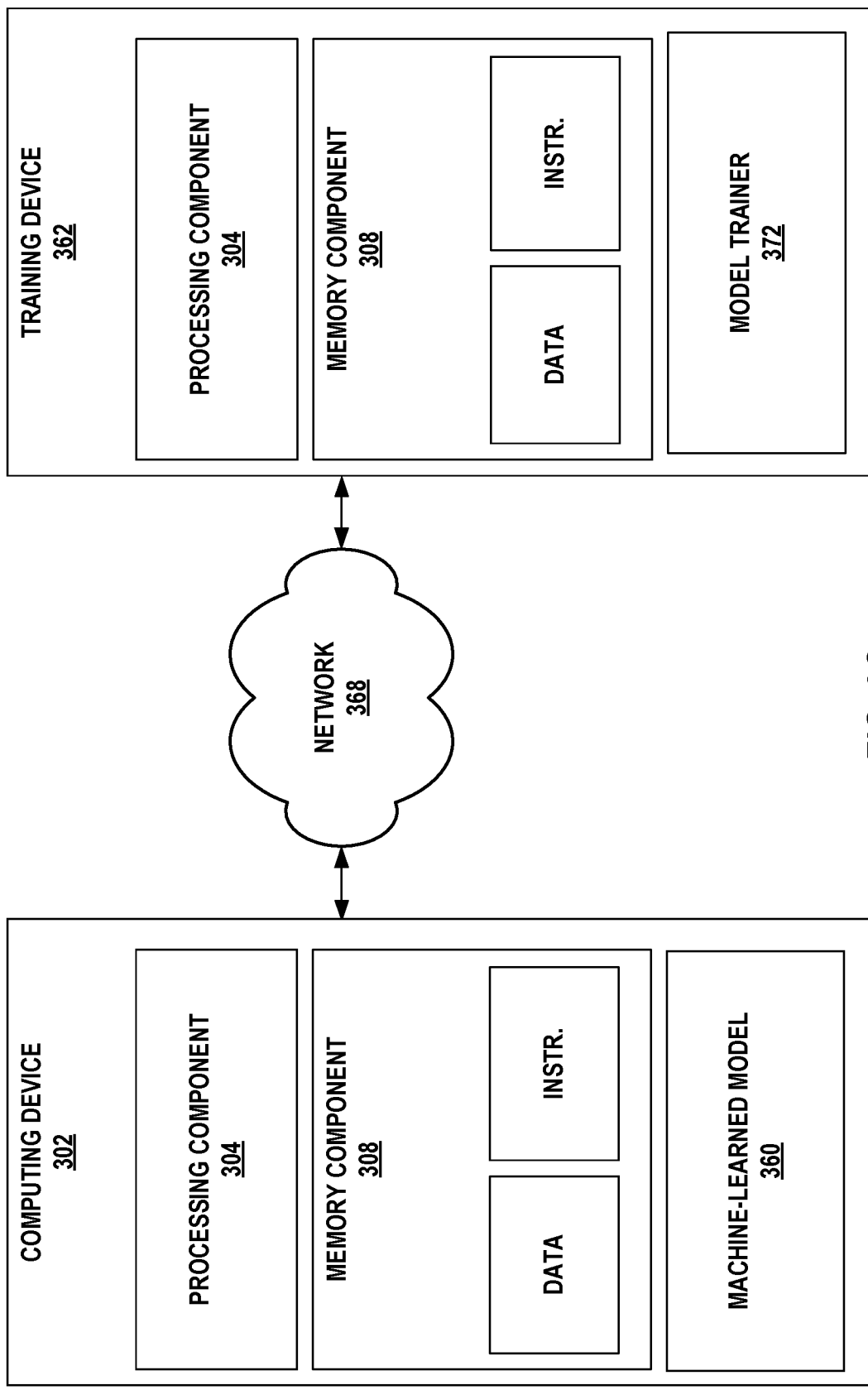

FIGS. 3A-3C are conceptual diagrams illustrating aspects of an example machine-learned model trained for liquid threshold determination and/or activity recognition, in accordance with one or more aspects of the present disclosure. FIGS. 3A-3C are described below in the context of operating mode selection module 118 of FIG. 1 and operating mode selection module 218 of FIG. 2. For example, in some instances, machine-learned model 360, as referenced below, may be an example of machine-learned model 160 of FIG. 1 and machine-learned model 260 of FIG. 2.

FIG. 3A depicts a conceptual diagram of an example machine-learned model according to example implementations of the present disclosure. As illustrated in FIG. 3A, in some implementations, machine-learned model 360 is trained to receive input data of one or more types and, in response, provide output data of one or more types. Thus, FIG. 3A illustrates machine-learned model 360 performing inference. For example, the input data received by machine-learned model 360 may be sensor data, such as sensor data generated by input component of presence-sensitive screen 212, barometer 214, and other sensors 216. As described below, machine-learned model 360 may be used to determine liquid droplets, liquid immersion, activities such as diving and swimming based on sensor data input.

The input data may include one or more features associated with an instance or an example. In some implementations, one or more features associated with the instance or example may be organized into a feature vector. In some implementations, the output data may include one or more predictions. Predictions may also be referred to as inferences. Thus, given features associated with a particular instance, machine-learned model 360 may output a prediction for such instance based on the features.

Machine-learned model 360 may be or include one or more of various different types of machine-learned models. In particular, in some implementations, machine-learned model 360 may perform classification, regression, clustering, anomaly detection, recommendation generation, and/or other tasks.

In some implementations, machine-learned model 360 may perform various types of classification based on the input data. For example, machine-learned model 360 may perform binary classification or multiclass classification. In binary classification, the output data may include a classification of the input data into one of two different classes. In multiclass classification, the output data may include a classification of the input data into one (or more) of more than two classes. The classifications may be single label or multi-label. Machine-learned model 360 may perform discrete categorical classification in which the input data is simply classified into one or more classes or categories.

In some implementations, machine-learned model 360 may perform classification in which machine-learned model 360 provides, for each of one or more classes, a numerical value descriptive of a degree to which it is believed that the input data should be classified into the corresponding class. In some instances, the numerical values provided by machine-learned model 360 may be referred to as "confidence scores" that are indicative of a respective confidence associated with classification of the input into the respective class. In some implementations, the confidence scores may be compared to one or more thresholds to render a discrete categorical prediction. In some implementations, only a certain number of classes (e.g., one) with the relatively largest confidence scores may be selected to render a discrete categorical prediction.

Machine-learned model 360 may output a probabilistic classification. For example, machine-learned model 360 may predict, given a sample input, a probability distribution over a set of classes. Thus, rather than outputting only the most likely class to which the sample input should belong, machine-learned model 360 may output, for each class, a probability that the sample input belongs to such class. In some implementations, the probability distribution over all possible classes may sum to one. In some implementations, a Softmax function, or other type of function or layer may be used to squash a set of real values respectively associated with the possible classes to a set of real values in the range (0, 1) that sum to one.

In some examples, the probabilities provided by the probability distribution may be compared to one or more thresholds to render a discrete categorical prediction. In some implementations, only a certain number of classes (e.g., one) with the relatively largest predicted probability may be selected to render a discrete categorical prediction.

In cases in which machine-learned model 360 performs classification, machine-learned model 360 may be trained using supervised learning techniques. For example, machine-learned model 360 may be trained on a training dataset that includes training examples labeled as belonging (or not belonging) to one or more classes. Further details regarding supervised training techniques are provided below in the descriptions of FIGS. 3B through 3C.

In some implementations, machine-learned model 360 may perform regression to provide output data in the form of a continuous numeric value. The continuous numeric value may correspond to any number of different metrics or numeric representations, including, for example, currency values, scores, or other numeric representations. As examples, machine-learned model 360 may perform linear regression, polynomial regression, or nonlinear regression. As examples, machine-learned model 360 may perform simple regression or multiple regression. As described above, in some implementations, a Softmax function or other function or layer may be used to squash a set of real values respectively associated with two or more possible classes to a set of real values in the range (0, 1) that sum to one.

Machine-learned model 360 may, in some cases, act as an agent within an environment. For example, machine-learned model 360 may be trained using reinforcement learning, which will be discussed in further detail below.

In some implementations, machine-learned model 360 may be a parametric model while, in other implementations, machine-learned model 360 may be a non-parametric model. In some implementations, machine-learned model 360 may be a linear model while, in other implementations, machine-learned model 360 may be a non-linear model.

As described above, machine-learned model 360 may be or include one or more of various different types of machine-learned models. Examples of such different types of machine-learned models are provided below for illustration. One or more of the example models described below may be used (e.g., combined) to provide the output data in response to the input data. Additional models beyond the example models provided below may be used as well.

In some implementations, machine-learned model 360 may be or include one or more classifier models such as, for example, linear classification models; quadratic classification models; etc. Machine-learned model 360 may be or include one or more regression models such as, for example, simple linear regression models; multiple linear regression models; logistic regression models; stepwise regression models; multivariate adaptive regression splines; locally estimated scatterplot smoothing models; etc.

In some implementations, machine-learned model 360 may be or include one or more artificial neural networks (also referred to simply as neural networks). A neural network may include a group of connected nodes, which also may be referred to as neurons or perceptrons. A neural network may be organized into one or more layers. Neural networks that include multiple layers may be referred to as "deep" networks. A deep network may include an input layer, an output layer, and one or more hidden layers positioned between the input layer and the output layer. The nodes of the neural network may be connected or non-fully connected.

Machine-learned model 360 may be or include one or more feed forward neural networks. In feed forward networks, the connections between nodes do not form a cycle. For example, each connection may connect a node from an earlier layer to a node from a later layer.

In some instances, machine-learned model 360 may be or include one or more recurrent neural networks. In some instances, at least some of the nodes of a recurrent neural network may form a cycle. Recurrent neural networks may be especially useful for processing input data that is sequential in nature. In particular, in some instances, a recurrent neural network may pass or retain information from a previous portion of the input data sequence to a subsequent portion of the input data sequence through the use of recurrent or directed cyclical node connections.

In some examples, sequential input data may include time-series data (e.g., sensor data versus time or imagery captured at different times). For example, a recurrent neural network may analyze sensor data versus time to detect or predict a swipe direction, to perform handwriting recognition, etc. Sequential input data may include words in a sentence (e.g., for natural language processing, speech detection or processing, etc.); notes in a musical composition; sequential actions taken by a user (e.g., to detect or predict sequential application usage); sequential object states; etc.

Example recurrent neural networks include long short-term (LSTM) recurrent neural networks; gated recurrent units; bi-direction recurrent neural networks; continuous time recurrent neural networks; neural history compressors; echo state networks; Elman networks; Jordan networks; recursive neural networks; Hopfield networks; fully recurrent networks; sequence-to-sequence configurations; etc.

In some implementations, machine-learned model 360 may be or include one or more convolutional neural networks. In some instances, a convolutional neural network may include one or more convolutional layers that perform convolutions over input data using learned filters.

Filters may also be referred to as kernels. Convolutional neural networks may be especially useful for vision problems such as when the input data includes imagery such as still images or video. However, convolutional neural networks may also be applied for natural language processing.

In some examples, machine-learned model 360 may be or include one or more generative networks such as, for example, generative adversarial networks. Generative networks may be used to generate new data such as new images or other content.

Machine-learned model 360 may be or include an autoencoder. In some instances, the aim of an autoencoder is to learn a representation (e.g., a lower-dimensional encoding) for a set of data, typically for the purpose of dimensionality reduction. For example, in some instances, an autoencoder may seek to encode the input data and then provide output data that reconstructs the input data from the encoding.

Recently, the autoencoder concept has become more widely used for learning generative models of data. In some instances, the autoencoder may include additional losses beyond reconstructing the input data.

Machine-learned model 360 may be or include one or more other forms of artificial neural networks such as, for example, deep Boltzmann machines; deep belief networks; stacked autoencoders; etc. Any of the neural networks described herein may be combined (e.g., stacked) to form more complex networks.

One or more neural networks may be used to provide an embedding based on the input data. For example, the embedding may be a representation of knowledge abstracted from the input data into one or more learned dimensions. In some instances, embeddings may be a useful source for identifying related entities. In some instances, embeddings may be extracted from the output of the network, while in other instances embeddings may be extracted from any hidden node or layer of the network (e.g., a close to final but not final layer of the network). Embeddings may be useful for performing auto suggest next video, product suggestion, entity or object recognition, etc. In some instances, embeddings are useful inputs for downstream models. For example, embeddings may be useful to generalize input data (e.g., search queries) for a downstream model or processing system.

In some implementations, machine-learned model 360 may perform one or more dimensionality reduction techniques such as, for example, principal component analysis; kernel principal component analysis; graph-based kernel principal component analysis; principal component regression; partial least squares regression; Sammon mapping; multidimensional scaling; projection pursuit; linear discriminant analysis; mixture discriminant analysis; quadratic discriminant analysis; generalized discriminant analysis; flexible discriminant analysis; autoencoding; etc.

In some implementations, machine-learned model 360 may perform or be subjected to one or more reinforcement learning techniques such as Markov decision processes; dynamic programming; Q functions or Q-learning; value function approaches; deep Q-networks; differentiable neural computers; asynchronous advantage actor-critics; deterministic policy gradient; etc.

In some implementations, machine-learned model 360 may be an autoregressive model. In some instances, an autoregressive model may specify that the output data depends linearly on its own previous values and on a stochastic term. In some instances, an autoregressive model may take the form of a stochastic difference equation. One example autoregressive model is WaveNet, which is a generative model for raw audio.

In some implementations, machine-learned model 360 may include or form part of a multiple model ensemble. As one example, bootstrap aggregating may be performed, which may also be referred to as "bagging." In bootstrap aggregating, a training dataset is split into a number of subsets (e.g., through random sampling with replacement) and a plurality of models are respectively trained on the number of subsets. At inference time, respective outputs of the plurality of models may be combined (e.g., through averaging, voting, or other techniques) and used as the output of the ensemble.

One example ensemble is a random forest, which may also be referred to as a random decision forest. Random forests are an ensemble learning method for classification, regression, and other tasks. Random forests are generated by producing a plurality of decision trees at training time. In some instances, at inference time, the class that is the mode of the classes (classification) or the mean prediction (regression) of the individual trees may be used as the output of the forest. Random decision forests may correct for decision trees' tendency to overfit their training set.

Another example ensemble technique is stacking, which may, in some instances, be referred to as stacked generalization. Stacking includes training a combiner model to blend or otherwise combine the predictions of several other machine-learned models. Thus, a plurality of machine-learned models (e.g., of same or different type) may be trained based on training data. In addition, a combiner model may be trained to take the predictions from the other machine-learned models as inputs and, in response, produce a final inference or prediction. In some instances, a single-layer logistic regression model may be used as the combiner model.

Another example ensemble technique is boosting. Boosting may include incrementally building an ensemble by iteratively training weak models and then adding to a final strong model. For example, in some instances, each new model may be trained to emphasize the training examples that previous models misinterpreted (e.g., misclassified). For example, a weight associated with each of such misinterpreted examples may be increased. One common implementation of boosting is AdaBoost, which may also be referred to as Adaptive Boosting. Other example boosting techniques include LPBoost; TotalBoost; BrownBoost; xgboost; MadaBoost, LogitBoost, gradient boosting; etc. Furthermore, any of the models described above (e.g., regression models and artificial neural networks) may be combined to form an ensemble. As an example, an ensemble may include a top level machine-learned model or a heuristic function to combine and/or weight the outputs of the models that form the ensemble.

In some implementations, multiple machine-learned models (e.g., that form an ensemble may be linked and trained jointly (e.g., through backpropagation of errors sequentially through the model ensemble). However, in some implementations, only a subset (e.g., one) of the jointly trained models is used for inference.

In some implementations, machine-learned model 360 may be used to preprocess the input data for subsequent input into another model. For example, machine-learned model 360 may perform dimensionality reduction techniques and embeddings (e.g., matrix factorization, principal components analysis, singular value decomposition, word2vec/GLOVE, and/or related approaches); clustering; and even classification and regression for downstream consumption. Many of these techniques have been discussed above and will be further discussed below.

As discussed above, machine-learned model 360 may be trained or otherwise configured to receive the input data and, in response, provide the output data. The input data may include different types, forms, or variations of input data. As examples, in various implementations, the input data may include features that describe the content (or portion of content) initially selected by the user, e.g., content of user-selected document or image, links pointing to the user selection, links within the user selection relating to other files available on device or cloud, metadata of user selection, etc. Additionally, with user permission, the input data includes the context of user usage, either obtained from the app itself or from other sources. Examples of usage context include breadth of share (sharing publicly, or with a large group, or privately, or a specific person), context of share, etc. When permitted by the user, additional input data may include the state of the device, e.g., the location of the device, the apps running on the device, etc.

Additionally, with user permission, the input data includes the context of user usage, either obtained from the app itself or from other sources. Examples of usage context include breadth of share (sharing publicly, or with a large group, or privately, or a specific person), context of share, etc. When permitted by the user, additional input data may include the state of the device, e.g., the location of the device, the apps running on the device, etc.

In some implementations, machine-learned model 360 may receive and use the input data in its raw form. In some implementations, the raw input data may be preprocessed. Thus, in addition or alternatively to the raw input data, machine-learned model 360 may receive and use the preprocessed input data.

In some implementations, preprocessing the input data may include extracting one or more additional features from the raw input data. For example, feature extraction techniques may be applied to the input data to generate one or more new, additional features. Example feature extraction techniques include edge detection; corner detection; blob detection; ridge detection; scale-invariant feature transform; motion detection; optical flow; Hough transform; etc.

In some implementations, the extracted features may include or be derived from transformations of the input data into other domains and/or dimensions. As an example, the extracted features may include or be derived from transformations of the input data into the frequency domain. For example, wavelet transformations and/or fast Fourier transforms may be performed on the input data to generate additional features.

In some implementations, the extracted features may include statistics calculated from the input data or certain portions or dimensions of the input data. Example statistics include the mode, mean, maximum, minimum, or other metrics of the input data or portions thereof.

In some implementations, as described above, the input data may be sequential in nature. In some instances, the sequential input data may be generated by sampling or otherwise segmenting a stream of input data. As one example, frames may be extracted from a video. In some implementations, sequential data may be made non-sequential through summarization.

As another example preprocessing technique, portions of the input data may be imputed. For example, additional synthetic input data may be generated through interpolation and/or extrapolation.

As another example preprocessing technique, some or all of the input data may be scaled, standardized, normalized, generalized, and/or regularized. Example regularization techniques include ridge regression; least absolute shrinkage and selection operator (LASSO); elastic net; least-angle regression; cross-validation; L1 regularization; L2 regularization; etc. As one example, some or all of the input data may be normalized by subtracting the mean across a given dimension's feature values from each individual feature value and then dividing by the standard deviation or other metric.

As another example preprocessing technique, some or all or the input data may be quantized or discretized. In some cases, qualitative features or variables included in the input data may be converted to quantitative features or variables. For example, one hot encoding may be performed.

In some examples, dimensionality reduction techniques may be applied to the input data prior to input into machine-learned model 360. Several examples of dimensionality reduction techniques are provided above, including, for example, principal component analysis; kernel principal component analysis; graph-based kernel principal component analysis; principal component regression; partial least squares regression; Sammon mapping; multidimensional scaling; projection pursuit; linear discriminant analysis; mixture discriminant analysis; quadratic discriminant analysis; generalized discriminant analysis; flexible discriminant analysis; autoencoding; etc.

In some implementations, during training, the input data may be intentionally deformed in any number of ways to increase model robustness, generalization, or other qualities. Example techniques to deform the input data include adding noise; changing color, shade, or hue; magnification; segmentation; amplification; etc.

In response to receipt of the input data, machine-learned model 360 may provide the output data. The output data may include different types, forms, or variations of output data. As examples, in various implementations, the output data may include content, either stored locally on the user device or in the cloud, that is relevantly shareable along with the initial content selection.

As discussed above, in some implementations, the output data may include various types of classification data (e.g., binary classification, multiclass classification, single label, multi-label, discrete classification, regressive classification, probabilistic classification, etc.) or may include various types of regressive data (e.g., linear regression, polynomial regression, nonlinear regression, simple regression, multiple regression, etc.). In other instances, the output data may include clustering data, anomaly detection data, recommendation data, or any of the other forms of output data discussed above.

In some implementations, the output data may influence downstream processes or decision-making. As one example, in some implementations, the output data may be interpreted and/or acted upon by a rules-based regulator.

The present disclosure provides systems and methods that include or otherwise leverage one or more machine-learned models to suggest content, either stored locally on the user's device or in the cloud, that is relevantly shareable along with the initial content selection based on features of the initial content selection. Any of the different types or forms of input data described above may be combined with any of the different types or forms of machine-learned models described above to provide any of the different types or forms of output data described above.

The systems and methods of the present disclosure may be implemented by or otherwise executed on one or more computing devices. Example computing devices include user computing devices (e.g., laptops, desktops, and mobile computing devices such as tablets, smartphones, wearable computing devices, etc.); embedded computing devices (e.g., devices embedded within a vehicle, camera, image sensor, industrial machine, satellite, gaming console or controller, or home appliance such as a refrigerator, thermostat, energy meter, home energy manager, smart home assistant, etc.); other computing devices; or combinations thereof.

FIG. 3B illustrates a conceptual diagram of computing device 302, which is an example of computing device 102 of FIG. 1. Computing device 302 includes processing component 304, memory component 308 and machine-learned model 360. Computing device 302 may store and implement machine-learned model 360 locally (i.e., on-device). Thus, machine-learned model 360 may be stored at and/or implemented locally by an embedded device or a user computing device such as a mobile device. Output data obtained through local implementation of machine-learned model 360 at the embedded device or the user computing device may be used to improve performance of the embedded device or the user computing device (e.g., an application implemented by the embedded device or the user computing device).

FIG. 3C illustrates a conceptual diagram of an example computing device in communication with an example training computing system that includes a model trainer. FIG. 3C includes computing device 302 communicating with training device 362 over network 368. Computing device 302 is an example of computing device 102 of FIG. 1. Machine-learned model 360 described herein may be trained at a training computing system, such as training device 362, and then provided for storage and/or implementation at one or more computing devices, such as computing device 302. For example, model trainer 372 executes locally at training device 362. In some examples, training device 362, including model trainer 372, may be included in or separate from computing device 302 or any other computing device that implements machine-learned model 360.

Computing device 302 that implements machine-learned model 360 or other aspects of the present disclosure and training device 362 that trains machine-learned model 360 may include a number of hardware components that enable performance of the techniques described herein. For example, computing device 302 may include one or more memory devices that store some or all of machine-learned model 360. For example, machine-learned model 360 may be a structured numerical representation that is stored in memory. The one or more memory devices may also include instructions for implementing machine-learned model 360 or performing other operations. Example memory devices include RAM, ROM, EEPROM, EPROM, flash memory devices, magnetic disks, etc., and combinations thereof.

Computing device 302 may also include one or more processing devices that implement some or all of machine-learned model 360 and/or perform other related operations. Example processing devices include one or more of: a central processing unit (CPU); a visual processing unit (VPU); a graphics processing unit (GPU); a tensor processing unit (TPU); a neural processing unit (NPU); a neural processing engine; a core of a CPU, VPU, GPU, TPU, NPU or other processing device; an application specific integrated circuit (ASIC); a field programmable gate array (FPGA); a co-processor; a controller; or combinations of the processing devices described above. Processing devices may be embedded within other hardware components such as, for example, an image sensor, accelerometer, etc.

Training device 362 may perform graph processing techniques or other machine learning techniques using one or more machine learning platforms, frameworks, and/or libraries, such as, for example, TensorFlow, Caffe/Caffe2, Theano, Torch/PyTorch, MXnet, CNTK, etc. In some implementations, machine-learned model 360 may be trained in an offline fashion or an online fashion. In offline training (also known as batch learning), machine-learned model 360 is trained on the entirety of a static set of training data. In online learning, machine-learned model 360 is continuously trained (or re-trained) as new training data becomes available (e.g., while the model is used to perform inference).

Model trainer 372 may perform centralized training of machine-learned model 360 (e.g., based on a centrally stored dataset). In other implementations, decentralized training techniques such as distributed training, federated learning, or the like may be used to train, update, or personalize machine-learned model 360.

Machine-learned model 360 described herein may be trained according to one or more of various different training types or techniques. For example, in some implementations, machine-learned model 360 may be trained by model trainer 372 using supervised learning, in which machine-learned model 360 is trained on a training dataset that includes instances or examples that have labels. The labels may be manually applied by experts, generated through crowdsourcing, or provided by other techniques (e.g., by physics-based or complex mathematical models). In some implementations, if the user has provided consent, the training examples may be provided by the user computing device. In some implementations, this process may be referred to as personalizing the model.

Once training device 362 has finished training machine-learned model 360, machine-learned model 360 may be installed onto computing device 302. For example, training device 362 may transfer machine-learned model 360 to computing device 302 via network 368, or machine-learned model 360 may be installed in computing device 302 during manufacturing of computing device 302. In some examples, once machine-learned model 360 has been trained at training device 362, training device 362 may perform post-training weight quantization, such as by using TensorFlow Lite libraries, to compress model weights, such as by compressing model weights into 8-bit integers, to enable computing device 302 to perform more efficient on-device inference using machine-learned model 360.

Figures 4A, 4B, 4C:
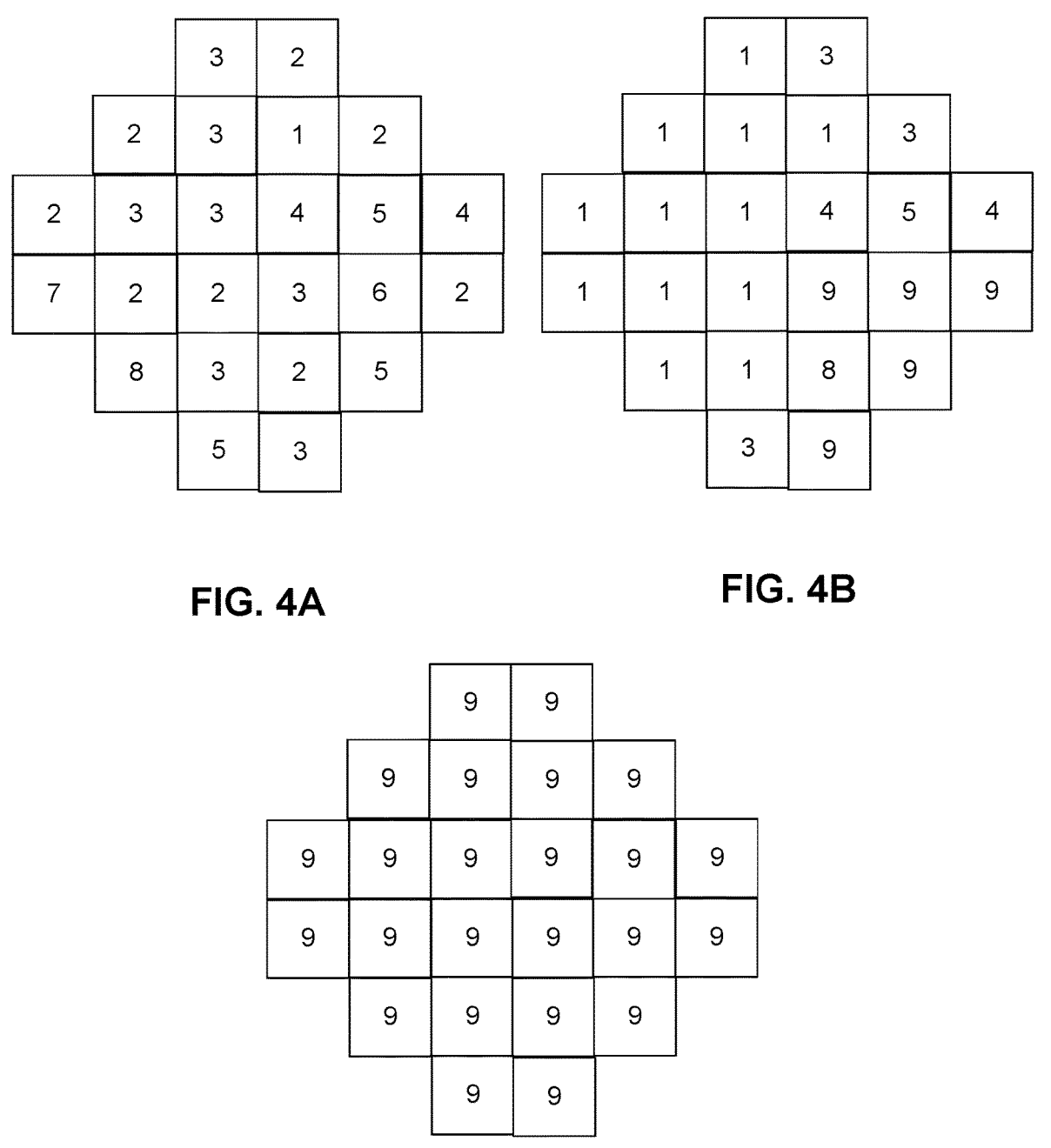

FIGS. 4A-4C are conceptual diagrams illustrating sensor values generated by presence-sensitive screen 212 of computing device 202 corresponding to inputs detected by presence-sensitive screen 212, in accordance with one or more aspects of the present disclosure. FIGS. 4A-4C show simplified sensor values detected at a screen of presence-sensitive screen 212 of computing device 202 in a range from 1-9 with 9 being the higher detected sensor values and 1 being the lower detected sensor values. In the example of FIGS. 4A-4C, there are 24 pad locations with individual detected sensor values, but this is merely illustrative and there may be more or fewer pad locations with individual detected sensor values.

FIG. 4A illustrates raw intensity values from a 24-pad presence-sensitive screen for water droplets. In FIG. 4A, pad locations with high intensity detected values are spread out among pad locations with lower intensity value locations. FIG. 4B illustrates raw intensity values from a 24-pad presence-sensitive screen for a finger touch. In FIG. 4B, pad locations with higher intensity detected values cluster in the bottom right with other pad locations of the locations of presence-sensitive screen 212 having relatively low values. FIG. 4C illustrates raw intensity values from a 24-pad presence-sensitive screen for water immersion. In FIG. 4C, all of the pad locations of the presence-sensitive screen 212 have high intensity detected values.

Barometer 214, the input component of presence-sensitive screen 212 and other sensors may produce sensor data that enables the construction of classifiers to determine at least a threshold of liquid at the presence-sensitive screen such as occurs with water immersion and water droplets. Radio frequency transceivers in computing device 202 may waste significant power due to water immersion because computing device 202 will have difficulties making a wireless connection to a base station through the liquid. Computing device 202 may inhibit such transmissions once water immersion is determined. Presence-sensitive screen 212 may also produce false touches due to water immersion and droplets. Computing device 202 may discard input from the input component of presence-sensitive screen 212 once the threshold of liquid at the presence-sensitive screen is determined.

Computing device 202 may determine feature values from sensor inputs to help determine the threshold of liquid at the presence-sensitive screen, classify as water immersion or water droplets, and/or set computing device 202 into a second operating mode.

In the second operating mode, computing device 202 may discard input from the input component of presence-sensitive screen 212 and/or may inhibit the radio frequency transceivers from operation.

One example of such constructed feature values is as follows:
On the 2-dimensional 6×6 grid of sensor pads from a 24-pad presence-sensitive screen shown above in FIGS. 4A-4C above, let:

$d_i(t)$ be the difference between the raw data from the i-th pad and its vendor-computed adaptive baseline at time t $\underline{r}_i(t)=[x_i(t), y_i(t)]$, with x, y∈Z be the vector representing the location of $d_i(t)$ $m_i(t)=|d_i(t)|$, and consider this a point mass at $r_i(t)$ Computing device 202 may efficiently compute feature values such as the following feature values, frame by frame using fixed-point math:
the total mass $$M(t)=\Sigma_i m_i(t)$$

the center of mass $$\underline{r}_{com}(t)=M(t)^{-1}\Sigma_i m_i(t)\underline{r}_i(t)$$

the moment of inertia about this center of mass $$J_{com}(t)=M(t)^{-1}\Sigma_i m_i(t)|\underline{r}_i(t)-\underline{r}_{com}(t)|^2$$

Computing device 202 may produce additional derived feature values based on mass, M(t), and moment of inertia, $J_{com}(t)$, such as d/dt M(t), $M(t)>T_{threshold}$, etc. Computing device 202 may filter feature values, such as through an infinite impulse response (IIR) filter, to create even more feature values, capturing different aspects of the history of feature values such as mass, M(t), and moment of inertia, $J_{com}(t)$, over longer timescales.

FIGS. 5A-5B are conceptual diagrams illustrating example plots of calculated feature values that computing device 202 may use for a liquid threshold determination, in accordance with one or more aspects of the present disclosure. FIG. 5A illustrates mass (solid line), M(t) and moment of inertia (dashed line), $J_{com}(t)$, for water droplets. FIG. 5B illustrates mass (solid line), M(t), and moment of inertia (dashed line), $J_{com}(t)$, for finger touches.

Computing device 202 may use the derived feature values to distinguish liquid droplet contacts from finger touches using machine-learned model 260. The "mass" feature value has a characteristically sharper spike for finger contacts than droplet contacts. The "mass" feature value curve for water droplets tends to be more extended than the mass feature value curve for water droplets. Additionally, the "moment of inertia" feature value for finger touches tends to match up with the "mass" feature value for finger touches in a way that the "moment of inertia" feature value for water droplets does not match up with the "mass" feature value for water droplets. Machine-learned models 260 may distinguish finger touches from water droplets using these feature values.

Machine-learned models 260 may be shallow neural networks and linear support vector machines (SVMs), which may use such rich feature values to achieve decent performance with low computational overhead. In one example, machine-learned models 260 may be gradient boosted decision trees. Computing device 202 may use post-processing with hysteresis. In one test, finger, water droplets, and palming were categorized with the following precision:

Palm precision is 100% and recall is 100% within 50 milliseconds.
Finger precision is 95% and recall is 98% within 50 milliseconds.
Droplet precision is 96% and recall is 90% within 50 milliseconds.

Water immersion and non-immersion were categorized with the following precision:
Immersion is detected 99% of the time within 5 seconds.
Non-immersion is detected 94% of the time within 5 seconds.

Computing device 202 may use sensor fusion using additional sensors, such as barometer 214, light sensor, temperature sensors, and motion sensors to improve the categorization accuracy. For example, computing device 202 may use relatively high signals from barometer 214 to distinguish water immersion from a palming event.

Figure 6:
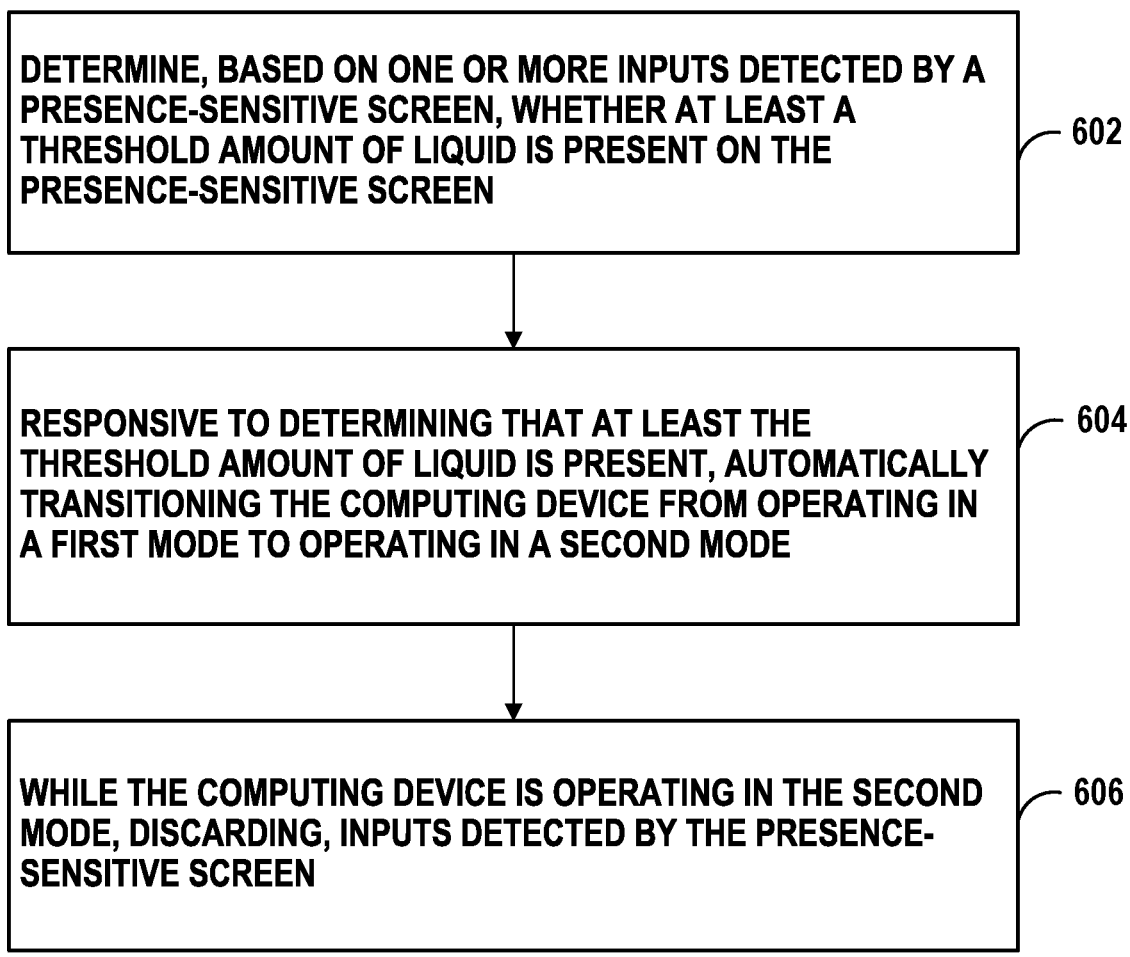
FIG. 6 is a flow diagram illustrating example operations of a computing device that that may automatically determine a threshold amount of liquid on a presence-sensitive screen, in accordance with one or more aspects of the present disclosure.

FIG. 6 is a flow diagram illustrating example operations of a computing device that may automatically determine a threshold amount of liquid on a presence-sensitive screen, in accordance with one or more aspects of the present disclosure. For purposes of illustration only, the example operations are described below within the context of computing device 102 and presence-sensitive screen 112 of FIG. 1.

As shown in FIG. 6, computing device 102 may determine, based on one or more inputs detected by presence-sensitive screen 112, whether at least a threshold amount of liquid is present on presence-sensitive screen 112 (602). Computing device 102 may, responsive to determining that at least the threshold amount of liquid is present, automatically transition computing device 102 from operating in a first operating mode to operating in a second operating mode (604). Computing device 102 may, while computing device 102 is operating in the second operating mode, discard inputs detected by presence-sensitive screen 112 (606).

This disclosure includes the following examples:

Example 1: A method comprising determining, by a computing device and based on one or more inputs detected by a presence-sensitive screen, whether at least a threshold amount of liquid is present on the presence-sensitive screen; responsive to determining that at least the threshold amount of liquid is present, automatically transitioning the computing device from operating in a first operating mode to operating in a second operating mode; and while the computing device is operating in the second operating mode, discarding, by the computing device, inputs detected by the presence-sensitive screen.

Example 2: The method of example 1, wherein determining whether at least the threshold amount of liquid is present is further based on an amount of atmospheric pressure detected by a barometer of the computing device.

Example 3. The method of example 2, further comprising: determining, by the computing device and based on the amount of atmospheric pressure and the one or more inputs detected by the presence-sensitive screen, whether the one or more inputs are indicative of a palming event; responsive to determining that the one or more inputs are not indicative of the palming event, determining that at least the threshold amount of liquid is present on the presence-sensitive screen;

and responsive to determining that the one or more inputs are indicative of the palming event, determining that at least the threshold amount of liquid is not present on the presence-sensitive screen.

Example 4: The method of any of examples 1-4, further comprising: while operating in the second operating mode, determining that the threshold amount of liquid is not present at the presence-sensitive screen for at least a period of time based on additional inputs detected by the presence-sensitive screen during the period of time; and responsive to determining that the threshold amount of liquid is not present at the presence-sensitive screen for at least the period of time, transitioning the computing device from operating in the second operating mode to operating in the first operating mode, wherein, while the computing device is operating in the first operating mode, inputs detected by the presence-sensitive screen are not discarded.

Example 5: The method of any of examples 1-4, further comprising: while the computing device is operating in the second operating mode: detecting, by the presence-sensitive screen, additional inputs; generating, by the computing device, a confidence score indicative of whether to exit the second operating mode and reenter the first operating mode by at least applying a machine-learned model to the additional inputs; and responsive to determining that that the confidence score exceeds a minimum confidence threshold, transitioning the computing device from operating in the second operating mode to operating in the first operating mode, wherein, while the computing device is operating in the first operating mode, inputs detected by the presence-sensitive screen are not discarded.

Example 6: The method of any of examples 1-5, wherein transitioning the computing device from operating in the first operating mode to operating in the second operating mode includes powering off, by the computing device, a radio frequency transceiver of the computing device.

Example 7: The method of any of examples 1-6, further comprising: detecting, by one or more additional sensors of the computing device, additional sensor inputs, wherein determining whether at least the threshold amount of liquid is present on the presence-sensitive screen is further based on the additional sensor inputs.

Example 8: A computing device comprising: a presence-sensitive screen; memory; and at least one processor communicably coupled to the memory and configured to: determine, based on one or more inputs detected by a presence-sensitive screen, whether at least a threshold amount of liquid is present on the presence-sensitive screen, responsive to determining that at least the threshold amount of liquid is present, automatically transition the computing device from operating in a first operating mode to a second operating mode; and while the computing device is operating in the second operating mode, discard inputs detected by the presence-sensitive screen.

Example 9: The computing device of example 8, further comprising a barometer, wherein the at least one processor is configured to determine whether at least the threshold amount of liquid is present further based on an amount of atmospheric pressure detected by the barometer.

Example 10: The computing device of example 9, wherein the at least one processor is further configured to: determine, based on the amount of atmospheric pressure and the one or more inputs detected by the presence-sensitive screen, whether the one or more inputs are indicative of a palming event; responsive to determining that the one or more inputs are not indicative of the palming event, determine that at least the threshold amount of liquid is present on the presence-sensitive screen; and responsive to determining that the one or more inputs are indicative of the palming event, determine that at least the threshold amount of liquid is not present on the presence-sensitive screen.

Example 11: The computing device of any of examples 8-10, wherein the at least one processor is further configured to: while the computing device is operating in the second operating mode, determine that the threshold amount of liquid is not present at the presence-sensitive screen for at least a period of time based on additional inputs detected by the presence-sensitive screen during the period of time; and responsive to determining that the threshold amount of liquid is not present at the presence-sensitive screen for at least the period of time, transition the computing device from operating in the second operating mode to operating in the first operating mode, wherein, while the computing device is operating in the first operating mode, inputs detected by the presence-sensitive screen are not discarded.

Example 12: The computing device of any of examples 8-11, wherein the at least one processor is further configured to: while the computing device is operating in the second operating mode: receive indications of additional inputs detected by the presence-sensitive screen; generate a confidence score indicative of whether to exit the second operating mode and reenter the first operating mode by at least applying a machine-learned model to indications of the additional inputs; and responsive to determining that that the confidence score exceeds a minimum confidence threshold, transition the computing device from operating in the second operating mode to operating in the first operating mode, wherein, while indications of additional inputs detected operating in the first operating mode, inputs detected by the presence-sensitive screen are not discarded.

Example 13: The computing device of any of examples 8-12, wherein to transition the computing device from operating in the first operating mode to operating in the second operating mode, the at least one processor is configured to power off a radio frequency transceiver of the computing device.

Example 14: The computing device of any of examples 8-13, further comprising one or more additional sensor inputs wherein the at least one processor is further configured to determine whether at least the threshold amount of liquid is present on the presence-sensitive screen further based on the additional sensor inputs.

Example 15: A non-transitory computer-readable storage medium having stored thereon instructions that, when executed, cause one or more processors of a computing device to: determine, based on one or more inputs detected by a presence-sensitive screen, whether at least a threshold amount of liquid is present on the presence-sensitive screen, responsive to determining that at least the threshold amount of liquid is present, automatically transition the computing device from operating in a first operating mode to operating in a second operating mode; and while the computing device is operating in the second operating mode, discard inputs detected by the presence-sensitive screen.

Example 16: The non-transitory computer-readable storage medium of example 15, wherein the instructions cause the one or more processors to determine whether at least the threshold amount of liquid is present based on an amount of atmospheric pressure detected by a barometer of the computing device.

Example 17: The non-transitory computer-readable storage medium of example 16, wherein the instructions further cause the one or more processors to: determine, based on the amount of atmospheric pressure and the one or more inputs detected by the presence-sensitive screen, whether the one or more inputs are indicative of a palming event; responsive to determining that the one or more inputs are not indicative of the palming event, determine that at least the threshold amount of liquid is present on the presence-sensitive screen; and responsive to determining that the one or more inputs are indicative of the palming event, determine that at least the threshold amount of liquid is not present on the presence-sensitive screen.

Example 18: The non-transitory computer-readable storage medium of any of examples 15-17, wherein the instructions further cause the one or more processors to: while the computing device is operating in the second operating mode, determine that the threshold amount of liquid is not present at the presence-sensitive screen for at least a period of time based on additional inputs detected by the presence-sensitive screen during the period of time; and responsive to determining that the threshold amount of liquid is not present at the presence-sensitive screen for at least the period of time, transition the computing device from operating in the second operating mode to operating in the first operating mode, wherein, while the computing device is operating in the first operating mode, inputs detected by the presence-sensitive screen are not discarded.

Example 19: The non-transitory computer-readable storage medium of any of examples 15-18, wherein the instructions further cause the one or more processors to: while the computing device is operating in the second operating mode: receive indications of additional inputs detected by the presence-sensitive screen; generate a confidence score indicative of whether to exit the second operating mode and reenter the first operating mode by at least applying a machine-learned model to the indications of the additional inputs; and responsive to determining that that the confidence score exceeds a minimum confidence threshold, transition the computing device from operating in the second operating mode to operating in the first operating mode, wherein, while the computing device is operating in the first operating mode, inputs detected by the presence-sensitive screen are not discarded.

Example 20: The non-transitory computer-readable storage medium of any of examples 15-19, wherein to transition the computing device from operating in the first operating mode to operating in the second operating mode, the instructions cause the one or more processors to power off a radio frequency transceiver of the computing device.

Example 21: The non-transitory computer-readable storage medium of any of examples 15-20, wherein the instructions cause the one or more processors to determine whether at least the threshold amount of liquid is present on the presence-sensitive screen further based on additional sensor inputs.

Example 22: A device comprising means for performing any combination of the methods of examples 1-7.

Example 23: A system implementing any combination of the methods of examples 1-7.

Example 24: A device implementing any combination of the methods of examples 1-7.

Example 25: A non-transitory computer-readable storage medium implementing any combination of the methods of examples 1-7.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. A computer program product may include a computer-readable medium.

By way of example, and not limitation, such computer-readable storage media may comprise RAM, ROM, EEPROM, CD-ROM or other optical disk storage, magnetic disk storage, or other magnetic storage devices, flash memory, or any other medium that may be used to store desired program code in the form of instructions or data structures and that may be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein may be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium includes a non-transitory medium. In some examples, the term "non-transitory" indicates that the storage medium is not embodied in a carrier wave or a propagated signal. In certain examples, a non-transitory storage medium may store data that can, over time, change (e.g., in RAM or cache). Although certain examples are described as outputting various information for display, techniques of the disclosure may output such information in other forms, such as audio, holographical, or haptic forms, to name only a few examples, in accordance with techniques of the disclosure.

Various examples have been described. These and other examples are within the scope of the following claims.

What is claimed is:

1. A method comprising:
   determining, by a computing device and based on an amount of atmospheric pressure detected by a barometer of the computing device and one or more inputs detected by a presence-sensitive screen of the computing device, whether the one or more inputs are indicative of a palming event;
   responsive to determining that the one or more inputs are indicative of the palming event, determining that at least a threshold amount of liquid is not present on the presence-sensitive screen;
   responsive to determining that the one or more inputs are not indicative of the palming event, determining, by the computing device and based on the one or more inputs, whether at least the threshold amount of liquid is present on the presence-sensitive screen; and
   responsive to determining that at least the threshold amount of liquid is present:
     automatically transitioning the computing device from operating in a first operating mode to operating in a second operating mode; and
     while the computing device is operating in the second operating mode, discarding, by the computing device, inputs detected by the presence-sensitive screen.

2. The method of claim 1, further comprising:
   while operating in the second operating mode, determining that the threshold amount of liquid is not present at the presence-sensitive screen for at least a period of time based on additional inputs detected by the presence-sensitive screen during the period of time; and
   responsive to determining that the threshold amount of liquid is not present at the presence-sensitive screen for at least the period of time, transitioning the computing device from operating in the second operating mode to operating in the first operating mode, wherein, while the computing device is operating in the first operating mode, inputs detected by the presence-sensitive screen are not discarded.

3. The method of claim 1, further comprising:
   while the computing device is operating in the second operating mode:
     detecting, by the presence-sensitive screen, additional inputs;
     generating, by the computing device, a confidence score indicative of whether to exit the second operating mode and reenter the first operating mode by at least applying a machine-learned model to the additional inputs; and
     responsive to determining that the confidence score exceeds a minimum confidence threshold, transitioning the computing device from operating in the second operating mode to operating in the first operating mode, wherein, while the computing device is operating in the first operating mode, inputs detected by the presence-sensitive screen are not discarded.

4. The method of claim 1, wherein transitioning the computing device from operating in the first operating mode to operating in the second operating mode includes powering off, by the computing device, a radio frequency transceiver of the computing device.

5. The method of claim 1, further comprising:
   detecting, by one or more additional sensors of the computing device, additional sensor inputs, wherein determining whether at least the threshold amount of liquid is present on the presence-sensitive screen is further based on the additional sensor inputs.

6. A computing device comprising:
   a presence-sensitive screen;
   a barometer;
   memory; and
   at least one processor communicably coupled to the memory and configured to:
     determine, based on an amount of atmospheric pressure detected by the barometer and one or more inputs detected by the presence-sensitive screen, whether the one or more inputs are indicative of a palming event;
     responsive to determining that the one or more inputs are indicative of the palming event, determine that at least a threshold amount of liquid is not present on the presence-sensitive screen;
     responsive to determining that the one or more inputs are not indicative of the palming event, determine, based on the one or more inputs, whether at least the threshold amount of liquid is present on the presence-sensitive screen; and
     responsive to determining that at least the threshold amount of liquid is present:
       automatically transition the computing device from operating in a first operating mode to operating in a second operating mode; and
       while the computing device is operating in the second operating mode, discard inputs detected by the presence-sensitive screen.

7. The computing device of claim 6, wherein the at least one processor is further configured to:
   while the computing device is operating in the second operating mode, determine that the threshold amount of liquid is not present at the presence-sensitive screen for at least a period of time based on additional inputs detected by the presence-sensitive screen during the period of time; and
   responsive to determining that the threshold amount of liquid is not present at the presence-sensitive screen for at least the period of time, transition the computing device from operating in the second operating mode to operating in the first operating mode, wherein, while the computing device is operating in the first operating mode, inputs detected by the presence-sensitive screen are not discarded.

8. The computing device of claim 6, wherein the at least one processor is further configured to:
while the computing device is operating in the second operating mode:
receive indications of additional inputs detected by the presence-sensitive screen;
generate a confidence score indicative of whether to exit the second operating mode and reenter the first operating mode by at least applying a machine-learned model to the indications of the additional inputs; and
responsive to determining that the confidence score exceeds a minimum confidence threshold, transition the computing device from operating in the second operating mode to operating in the first operating mode, wherein, while the computing device is operating in the first operating mode, inputs detected by the presence-sensitive screen are not discarded.

9. The computing device of claim 6, wherein to transition the computing device from operating in the first operating mode to operating in the second operating mode, the at least one processor is configured to power off a radio frequency transceiver of the computing device.

10. The computing device of claim 6, further comprising:
one or more additional sensors that detect additional sensor inputs,
wherein the at least one processor is further configured to determine whether at least the threshold amount of liquid is present on the presence-sensitive screen further based on the additional sensor inputs.

11. A non-transitory computer-readable storage medium having stored thereon instructions that, when executed, cause one or more processors of a computing device to:
determine, based on an amount of atmospheric pressure detected by a barometer and one or more inputs detected by a presence-sensitive screen, whether the one or more inputs are indicative of a palming event;
responsive to determining that the one or more inputs are indicative of the palming event, determine that at least a threshold amount of liquid is not present on the presence-sensitive screen;
responsive to determining that the one or more inputs are not indicative of the palming event, determine, based on the one or more inputs, whether at least the threshold amount of liquid is present on the presence-sensitive screen; and
responsive to determining that at least the threshold amount of liquid is present:
automatically transition the computing device from operating in a first operating mode to operating in a second operating mode; and
while the computing device is operating in the second operating mode, discard inputs detected by the presence-sensitive screen.

12. The non-transitory computer-readable storage medium of claim 11, wherein the instructions further cause the one or more processors to:
while the computing device is operating in the second operating mode, determine that the threshold amount of liquid is not present at the presence-sensitive screen for at least a period of time based on additional inputs detected by the presence-sensitive screen during the period of time; and
responsive to determining that the threshold amount of liquid is not present at the presence-sensitive screen for at least the period of time, transition the computing device from operating in the second operating mode to operating in the first operating mode, wherein, while the computing device is operating in the first operating mode, inputs detected by the presence-sensitive screen are not discarded.

13. The non-transitory computer-readable storage medium of claim 11, wherein the instructions further cause the one or more processors to:
while the computing device is operating in the second operating mode:
receive indications of additional inputs detected by the presence-sensitive screen;
generate a confidence score indicative of whether to exit the second operating mode and reenter the first operating mode by at least applying a machine-learned model to the indications of the additional inputs; and
responsive to determining that the confidence score exceeds a minimum confidence threshold, transition the computing device from operating in the second operating mode to operating in the first operating mode, wherein, while the computing device is operating in the first operating mode, inputs detected by the presence-sensitive screen are not discarded.

14. The computer-readable storage medium of claim 11, wherein to transition the computing device from operating in the first operating mode to operating in the second operating mode, the instructions cause the one or more processors to power off a radio frequency transceiver of the computing device.

* * * * *